(12) United States Patent
Hufenbach et al.

(10) Patent No.: US 10,683,907 B2
(45) Date of Patent: Jun. 16, 2020

(54) SPRING

(71) Applicant: LEICHTBAU-ZENTRUM SACHSEN GMBH, Dresden (DE)

(72) Inventors: Werner Hufenbach, Dresden (DE); Martin Lepper, Dresden (DE); Jens Werner, Coswig (DE); Christian Koehler, Dresden (DE)

(73) Assignee: Leichtbau-Zentrum Sachsen GmbH, Dresden (DE)

( * ) Notice: Subject to any disclaimer, the term of this patent is extended or adjusted under 35 U.S.C. 154(b) by 203 days.

(21) Appl. No.: 14/442,443

(22) PCT Filed: Nov. 8, 2013

(86) PCT No.: PCT/DE2013/100378
§ 371 (c)(1),
(2) Date: May 13, 2015

(87) PCT Pub. No.: WO2014/075661
PCT Pub. Date: May 22, 2014

(65) Prior Publication Data
US 2016/0201755 A1    Jul. 14, 2016

(30) Foreign Application Priority Data
Nov. 14, 2012   (DE) .......................... 10 2012 110 956

(51) Int. Cl.
*F16F 1/00*      (2006.01)
*F16F 15/04*     (2006.01)
(Continued)

(52) U.S. Cl.
CPC .............. *F16F 15/046* (2013.01); *F15B 7/00* (2013.01); *F16F 1/46* (2013.01); *F16F 9/0436* (2013.01);
(Continued)

(58) Field of Classification Search
CPC .................. F16F 1/46; F16F 5/00; F15B 7/00
(Continued)

(56) References Cited

U.S. PATENT DOCUMENTS 1,923,926 A * 8/1933 Faure-Roux ............ B64C 25/64
                                                        267/69
1,962,585 A * 6/1934 Faure-Roux .............. F16F 1/46
                                                        267/74
(Continued)

FOREIGN PATENT DOCUMENTS

DE          724359 C        8/1942
DE         1254030 C       11/1967
(Continued)

OTHER PUBLICATIONS

Machine translation of FR-2847958 (no date).*

*Primary Examiner* — Nicholas J Lane
(74) *Attorney, Agent, or Firm* — Abel Schillinger, LLP

(57) ABSTRACT

The invention relates to a spring (1, 23) comprising at least one tensile body (2, 17, 71, 76) that can be subjected to tensile stress and/or at least one compressive body (37) that can be subjected to compressive stress, the spring also comprising a force-displacement conversion unit (3, 18, 24) for converting the force-displacement of the spring force F, said force-displacement conversion unit (3, 18, 24) having a moveable input control element (6, 19, 29), to which the spring force can be applied and a moveable output control element (7, 20, 30, 54, 60, 68, 72) which is operatively connected to the tensile body (2, 17, 71, 76) or to the compressive body (37) in such a way that the spring force F produces a tensile stress in the tensile body (2, 17, 71, 76) or a compressive stress in the compressive body (37) in a specific force-displacement conversion ratio.

20 Claims, 15 Drawing Sheets

(51) Int. Cl.
*F16F 9/04* (2006.01)
*F16F 9/096* (2006.01)
*F16F 15/06* (2006.01)
*F16F 9/08* (2006.01)
*F16F 9/58* (2006.01)
*F16F 1/46* (2006.01)
*F15B 7/00* (2006.01)

(52) U.S. Cl.
CPC ............... *F16F 9/08* (2013.01); *F16F 9/096* (2013.01); *F16F 9/58* (2013.01); *F16F 15/06* (2013.01)

(58) Field of Classification Search
USPC ........................................ 267/73, 74; 60/533
See application file for complete search history.

(56) References Cited

U.S. PATENT DOCUMENTS

| | | | |
|---|---|---|---|
| 2,024,372 A | | 12/1935 | Kromm et al. |
| 2,560,005 A | * | 7/1951 | Shawbrook ............... F16F 5/00 236/98 |
| 3,056,706 A | * | 10/1962 | Knoppel ................ B29C 70/20 156/169 |
| 3,135,508 A | | 6/1964 | Boys |
| 3,761,109 A | | 9/1973 | Campbell |
| 3,955,807 A | | 5/1976 | Takahasi et al. |
| 4,234,172 A | | 11/1980 | Takahasi |
| 4,466,803 A | * | 8/1984 | Wilson ................. F16H 7/1236 188/285 |
| 4,715,589 A | * | 12/1987 | Woerndle ................. B66C 1/18 267/148 |
| 4,833,973 A | * | 5/1989 | Wang ....................... F15B 15/10 267/117 |
| 5,127,607 A | * | 7/1992 | McGuire ............. B60K 5/1216 244/54 |
| 5,366,324 A | * | 11/1994 | Arlt ....................... E21B 19/006 166/367 |
| 5,458,313 A | | 10/1995 | Tie et al. |
| 5,549,370 A | * | 8/1996 | Folsom ................. F16F 1/3665 267/149 |
| 5,613,665 A | * | 3/1997 | Lund ........................ F16F 1/46 267/69 |
| 6,446,944 B1 | * | 9/2002 | Ward ........................ F16F 9/48 188/286 |
| 6,609,597 B1 | * | 8/2003 | Heideman ................ F16F 9/52 188/270 |
| 2001/0007297 A1 | | 7/2001 | Gramb |
| 2005/0148909 A1 | * | 7/2005 | Weil ..................... A61H 31/004 601/41 |
| 2008/0245630 A1 | * | 10/2008 | Le ........................... F16F 9/064 188/280 |
| 2008/0309043 A1 | | 12/2008 | Jeong et al. |
| 2009/0008097 A1 | | 1/2009 | Nock |
| 2011/0221105 A1 | * | 9/2011 | Henksnneier .......... B60G 9/003 267/52 |
| 2012/0186380 A1 | * | 7/2012 | Yamada ............... B25J 19/0012 74/490.01 |
| 2013/0264085 A1 | * | 10/2013 | Ciotti ....................... B25F 3/00 173/29 |
| 2015/0192183 A1 | * | 7/2015 | Subramanian Muthu ................... F16F 1/46 267/141 |

FOREIGN PATENT DOCUMENTS

| | | | | |
|---|---|---|---|---|
| DE | 3146195 | A1 | 5/1983 | |
| DE | 4313133 | A1 | 10/1993 | |
| DE | 102004062599 | A1 | 7/2006 | |
| DE | 102007028424 | A1 | 12/2007 | |
| FR | 2847958 | A1 * | 6/2004 | ......... B25J 19/0016 |
| GB | 176083 | A | 2/1922 | |
| GB | 344557 | A | 3/1931 | |
| GB | 1055017 | | 1/1967 | |
| GB | 1081631 | A | 8/1967 | |
| GB | 1142324 | A | 2/1969 | |
| GB | 1419268 | A | 12/1975 | |
| GB | 1497465 | A | 1/1978 | |
| GB | 2358231 | A | 7/2001 | |

* cited by examiner

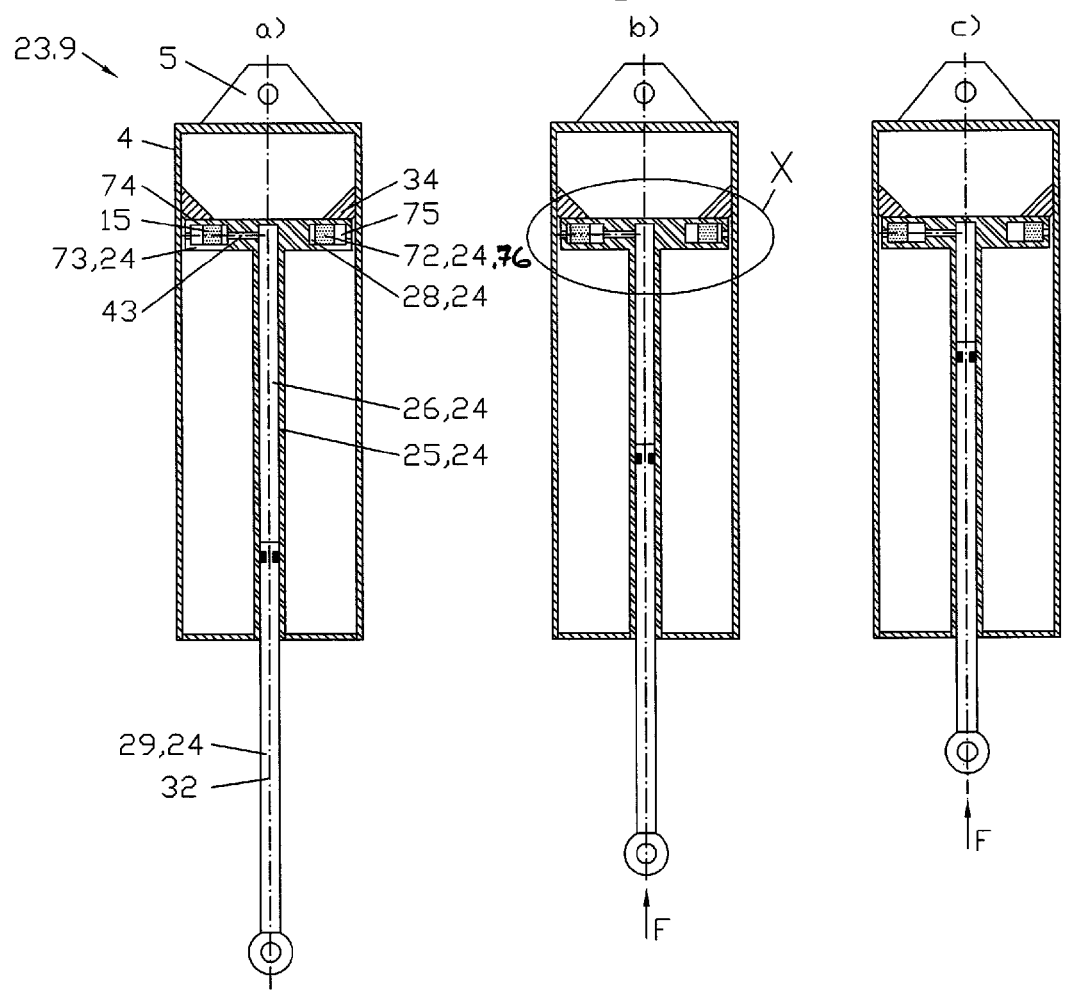
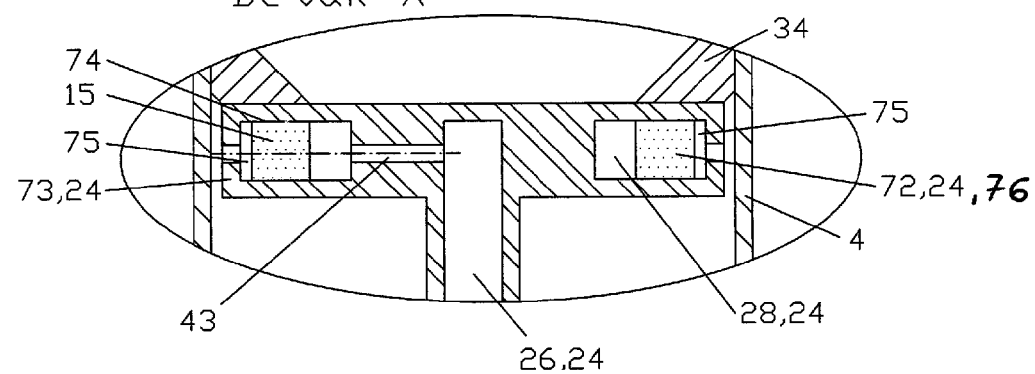

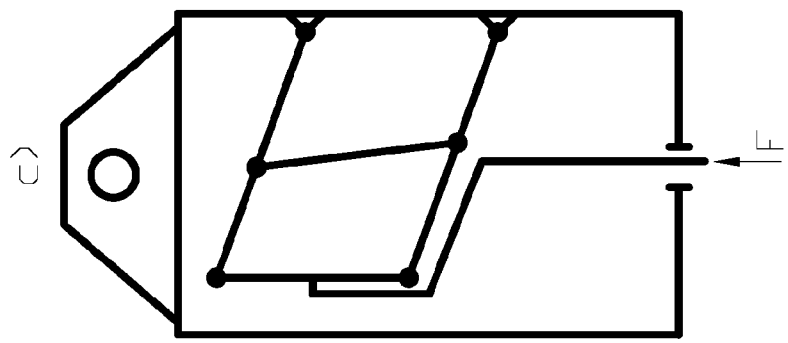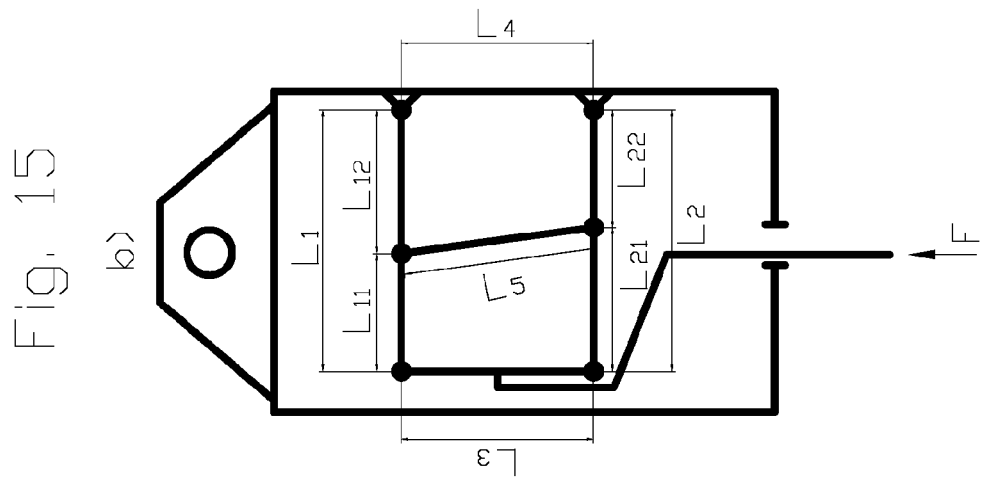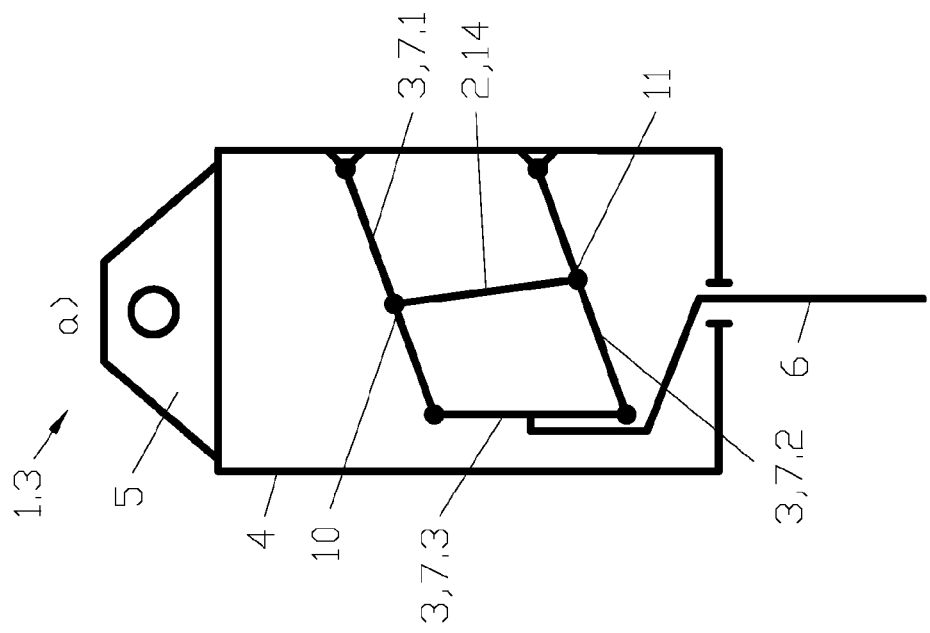
Fig. 15

SPRING

BACKGROUND OF THE INVENTION

1. Field of the Invention

The invention relates to a spring, as for example for use in motor vehicles or machines.

2. Discussion of Background Information

By way of prior art, mechanical springs, such as e.g. coil springs, flat spiral springs or leaf springs, are known. The impact forces transmitted from vehicle wheels or moving machine parts are offset by the springs, whereby the springs, fixed unilaterally to a fixed bearing for absorption of the opposing force, are subjected to torsion or bending stress.

Because of their design, these torsion and bending springs are mostly subjected to combined loads and stresses, from e.g. a combination of tensile, shear and compressive stresses. To convert the energy from this combined load input into a corresponding spring deflection, the springs require an elasticity of approximately 50% for what at the same time are large material cross sections.

Thus springs of this kind have a high material requirement, are very heavy and need considerable available space.

In connection with the technical endeavours to achieve a lighter, space-saving construction in engineering and, in particular, also in automotive engineering, the known springs are disadvantageous.

Endeavours to save on the available space required, e.g. by shortening the spring travel, bring about, in a veritably contrary manner, an even larger material requirement and larger overall mass of the spring with the known spring design.

SUMMARY OF THE INVENTION

The problem underlying the invention is to provide a spring with which the disadvantages of the prior art are remedied and which, in particular, satisfy the lightweight design requirements in respect of a reduction in mass and installation space.

In this context, the problem underlying the invention is the development of a spring which, while having a large spring deflection, offers high rigidity and hence guarantees a high energy absorption capacity.

The problem is solved according to the invention by a spring as set forth in the independent claims.

Advantageous embodiments and further developments of the invention can be seen in the dependent claims and also in the subsequent description and the associated drawings.

According to the invention, a spring is proposed with at least one tensile body that can be subjected to tensile stress and with a force-displacement conversion unit for converting the force displacement of the spring force, said force-displacement conversion unit having a moveable input control element to which the spring force can be applied and a moveable output control element, which is operatively connected to the tensile body in such a way that the spring force produces a tensile stress in the tensile body in a specific force-displacement conversion ratio.

A tensile body in the sense of the invention is a circumferentially or longitudinally extending geometric body with a cross section that is for example round, rectangular, prismatic or circular, which, when an external tensile or compressive force is applied, essentially only experiences tensile stress.

The invention takes as its starting point the knowledge that as a result of the combined load inputs in the conventional mechanical springs, the stress distribution in the material cross section is very uneven. For example, in the tubular cross section of a coil spring subjected to torsion, a parabolic stress curve from the inner wall to the outer wall ensues, with alternating shear and tensile stress and peak stress values on the inner tube wall. With a leaf spring exposed to bending stress, alternating compressive, tensile stress distributions are produced with a zero-crossing in the leaf axis and maximum stress values at the lower and upper boundary surface of the leaf spring. The material areas of the springs with low stress values or stress values at "0" are not involved in the work of deformation and hence not involved at all in the absorption of energy. Only approximately 10 to 20% of the specific energy absorption capacity of the material of conventional mechanical springs is actually utilised as a result. The material utilisation of conventional mechanical springs is therefore incomplete and inefficient.

A more even stress distribution and hence better material utilisation for energy absorption, however, is provided with the use according to the invention of a tensile body subjected solely to tension.

Admittedly, the circumferentially or longitudinally extending tensile body itself only has limited stretching properties, which is why, until now, such a tensile body did not seem suitable for a technical application as a spring. The elasticity of the tensile body according to the invention is, depending on the material and cross section, about 0.1 to 6%. The invention therefore envisages compensating for the limited elasticity of the tensile body using a specially adapted force-displacement conversion unit which, with powerful force-displacement conversion, converts a spring force applied over a distance to the input control element of the force-displacement conversion unit into a high force on the output control element, which—with what at the same time is a short path traveled by the output control element—can be absorbed by the tensile body as a result of its high capacity to withstand tensile stress. The force-displacement conversion according to the invention thus permits the use of the materially efficient tensile body as a spring.

The output control element, according to the invention, of the force-displacement conversion unit and the tensile body are designed and arranged in relation to each other as an operative unit in such a way that, via the output control element, essentially solely tensile stress is introduced into the tensile body. The moveable output control element can, for the transmission of force, be connected in a suitable arrangement to the secured, fixed tensile body, or act otherwise upon the latter. A force-fit, form-fit or firmly bonded connection, or a pneumatic or hydraulic effect, is conceivable. Corresponding versions of the design are described in the dependent claims and exemplary embodiments.

Hence a materially efficient spring is created that brings about high force absorption with a large spring deflection, which ultimately leads to a high specific energy absorption capacity and thus to a considerable saving in terms of installation space and materials.

In accordance with one advantageous design, the longitudinally extending tensile body is designed as a tensile rod. In this design of the tensile body, the output control element of the force-displacement conversion unit can introduce the enhanced spring force as tensile force in a concentrated manner in the direction of the central axis of the tensile rod. Hence the tensile force essentially acts perpendicular to the tensile rod's cross sectional area, resulting in a largely even distribution of stress across the whole cross sectional area of the rod. There occurs, for the most part, complete utilisation of the cross section of the rod and hence of the entire mass of the tensile rod for the absorption of energy, as a result of which the tensile rod achieves, with low material input, a higher energy absorption capacity than is possible with conventional mechanical spring elements.

If the output control element acts precisely centrically to the central axis of the tensile rod, so that the tensile force is directed precisely perpendicular to the cross sectional area of the rod, this produces a linear stress distribution across the whole cross sectional area of the rod and hence a particularly homogeneous utilisation of the cross section of the rod. As a result, the required material input for the tensile rod can be reduced further.

As a result of the tensile rod being subjected to a purely tensile load, there is also no danger of buckling.

In accordance with an alternative design, it is envisaged that the tensile body is designed as a pull ring.

Here, a suitably shaped and guided output control element of the force-displacement conversion unit can introduce the enhanced spring force as a compressive force directed in a radial direction from the inside onto an inner surface of the pull ring. In the ring cross section of the pull ring, a polar orthotropic tensile stress with an annual-ring like orientation is thereby released, which brings about a, for the most part, complete utilisation of the cross section of the pull ring for energy absorption.

In accordance with an advantageous embodiment, the tensile body consists of fiber composite material, preferably of carbon fiber-reinforced or glass fiber-reinforced plastic. A tensile body made from this material is particularly light and enables, in addition to a large energy absorption capacity, a—at the same time—more favourable elasticity compared with for example a tensile body made from steel.

In order to achieve an even higher energy absorption capacity for a tensile body made from fiber composite material, it is envisaged that the reinforcing fibers of the fiber composite material are arranged along the longitudinal axis of the tensile rod or as the case may be the circumferential direction of the pull ring, preferably extended continuously.

A particularly advantageous embodiment envisages that a bearing eye is provided on the tensile body and the reinforcing fibers are arranged as a fiber loop that at least partially encloses the bearing eye.

This increases the stability of the tensile body made from fiber composite material at a possible point of connection with the output control point for introduction of the tensile force into the tensile body and/or at a possible point of connection with a spring housing or the fixed bearing of the spring for introduction of the opposing force.

Furthermore, a spring is proposed with at least one compressive body that can be subjected to compressive stress and with a force-displacement conversion unit for the force-displacement conversion of the spring force, said force-displacement conversion unit having a moveable input control element to which the spring force can be applied, and a moveable output control element which is operatively connected to the compressive body in such a way that the spring force produces a compressive stress in the compressive body in a specific force-displacement conversion ratio.

A compressive body as defined by the invention is a compact geometric body with a cross section that is for example round, rectangular, prismatic or circular, which, when an external tensile or compressive force is applied, essentially only experiences compressive stress.

In the use according to the invention of a compressive body subjected only to pressure, likewise a more even distribution of stress and hence better material utilisation for energy absorption is achieved.

To compensate for the limited elasticity of the compressive body, the invention envisages a force-displacement conversion unit which, with powerful force-displacement conversion, converts the spring force applied over a distance to the input control element of the force-displacement conversion unit into a high force on the output control element, which—with what is at the same time a short path traveled by an output control element—can be absorbed by the compressive body as a result of its high capacity to withstand compressive stress. The force-displacement conversion according to the invention thus permits the use of the materially efficient compressive body as a spring.

The output control element, according to the invention, of the force-displacement conversion unit and the compressive body are designed and arranged in relation to each other as an operative unit in such a way that, via the output control element, essentially solely compressive stress is introduced into the compressive body. The moveable output control element can, for the transmission of force, be connected in a suitable arrangement to the secured, fixed compressive body, or act otherwise upon the latter. A force-fit, firmly bonded or form-fit connection, or a pneumatic or hydraulic effect is conceivable. Corresponding versions of the design are described in the dependent claims and exemplary embodiments.

With this design, too, a materially efficient spring is created which brings about high force absorption with a small spring deflection, which ultimately leads to a considerable saving in terms of installation space and materials.

Preferably the compression spring consists of an elastomer. As a result, the compressive body behaves in a viscoelastic way when subjected to compressive stress and provides a damping effect in addition to the spring effect.

In accordance with a preferred embodiment of the invention, the force-displacement conversion ratio of the force-displacement conversion unit is at least 1:3, preferably 1:10.

A force-displacement conversion ratio of the preferred order of magnitude permits the use of tensile or compressive bodies made from inherently rigid material such as spring steel, fiber composite material or titanium.

Where a force-displacement conversion ratio of for example 1:50 has been provided, tensile bodies or compressive bodies with particularly stiff material and very limited elasticity, such as e.g. titanium, can be used. Hence springs with particularly short spring deflections and an even lower material input and space requirement can be made a reality.

A particularly space-saving, slim design of the spring is produced if the input control element and the output control element of the force-displacement conversion unit are arranged in such a way that their axes of symmetry are essentially congruent. If the direction of movement of the control elements is also essentially in their axis of symmetry and hence along a common central line, a particularly slim, space-saving construction of the spring is possible.

Particularly advantageous designs are produced if one or more tensile bodies or, as the case may be, one or more compressive bodies are arranged centrically or coaxially axisymmetrically to the axis of symmetry of the output control element. This does not only have a favourable effect on the space requirement. In addition, an even, in the best case parallel-acting, lever-free distribution of the enhanced force on the tensile body or compressive body can be achieved. In this way, a particularly even distribution of tensile or compressive stress can be generated across the whole cross section or the tensile body or bodies or compressive bodies.

Preferably, the input control element, the output control element and/or the tensile body or compressive body are arranged in a fixed spring housing which offers protection of the components of the spring from damage and dirt. In addition, the spring housing offers suitable means of fixing for the force-displacement conversion unit and/or the tensile body or compressive body for the purpose of transmission of force.

In accordance with a particularly preferred embodiment of the invention, a hydraulic force-displacement conversion unit is designed with a hydraulic drive stage and a hydraulic driven stage, which has two working chambers connected to each other and filled with a hydraulic medium, and the input control element at least partially bounds the working chamber of the drive stage at the driving end and the output control element at least partially bounds the working chamber of the driven stage at the driven end.

Compared with mechanical solutions for force-displacement conversion, the hydraulic force-displacement conversion unit delivers high conversion ratios while at the same time having a low space and material requirement, and is therefore very efficient. The conversion work is performed by the hydraulic medium, such as e.g. hydraulic oil which, upon operation of the input control element, which is guided so as to be moveable, between the working chamber of the drive stage at the driving end and the working chamber of the driven stage at the driven end, overflows and drives the output control element which is guided so as to be moveable. The working chambers are graduated in their sizes in relation to one another in accordance with the conversion ratios to be achieved. The components of the drive and driven stage and also the associated control elements of the hydraulic force-displacement conversion require little space, can be positioned flexibly in relation to each other and have a small mass.

In an advantageous embodiment of the hydraulic force-displacement conversion unit, the drive stage has a drive cylinder that forms the working chamber at the driving end and a drive piston which as an input control element is guided so as to be moveable in the drive cylinder and bounds the working chamber at the driving end.

In a further advantageous embodiment of the hydraulic force-displacement conversion unit, the driven stage has a driven cylinder that forms the working chamber at the driven end and a driven piston which as an output control element is guided so as to be moveable in the driven cylinder and bounds the working chamber at the driven end.

In this way the drive stage and/or driven stage bring about, with simply designed means, a linear movement of their control elements as a basis for diverse alternatives for the transmission of spring force as an axial tensile or compressive force on the tensile body or compressive body.

One advantageous embodiment envisages that the input control element has a drive piston of the type with a hollow profile, in particularly hollow cylindrical, and/or the output control element has a driven piston of the type with a hollow profile, particularly hollow cylindrical.

Working together with a cylindrically shaped drive cylinder or driven cylinder, the hollow-profiled drive piston or driven piston preferably has a hollow cylindrical design. In this way, the mass of the drive piston and/or of the driven piston can be reduced while maintaining sufficient guidance in the drive cylinder or driven cylinder. The cavity in the interior of the drive piston or driven piston is, saving space in the process, available for the working chamber at the driving end or the working chamber at the driven end.

In a further advantageous design it is envisaged that the driven piston has a moveable membrane which bounds the working chamber at the driven end. Hence the output control element is mounted so as to be non-wearing. This design also does not require any seal between the moveable output control element and the chamber wall of the working chamber at the driven end. The output control element itself has a particularly low mass as a result of the use of the moveable membrane.

A particularly advantageous improvement to the hydraulically operated spring from a design point of view envisages that the output control element has a container-like, unidirectionally elastic, preferably elastic along its length, driven piston which encloses on all sides the working chamber at the driven end.

The container-like driven piston can, in the capacity of a unidirectionally elastic driven piston, consist of a material that is essentially only elastic in one direction, preferably lengthways. The container-like driven piston can also, however, alternatively or additionally, have a directional wall structure that is deformable, preferably lengthways, such as e.g. a wave-like, pleated structure. In other directions, particularly in the circumferential direction, the container-like driven piston is, in contrast, designed to be extensionally stiff in order to be able to absorb from the hydraulic medium the compressive forces generated by the working chamber at the driven end. The compressive force of the hydraulic oil in the working chamber at the driven end acts generally on the wall of the container-like driven piston and causes, as a result of the unidirectional elasticity, an elongation of the driven piston in the preferred direction, as a result of which the latter is stretched in a targeted way, preferably lengthways, and a specific operating direction is brought about. The container-like driven piston can, in this way, perform a linear adjusting movement and transmit the tensile or compressive force to be applied in a linear manner onto the tensile body or compressive body which, owing to its extension stiffness, applies the corresponding opposing force. What from a design perspective is a very simple structure of the driven piston is very resource-efficient; in particular, driven cylinders, and also guides and seals—as with a cylinder/piston design of the driven stage—are no longer required, which results in a further saving on constructional resources and a saving on mass.

Preferably, it is envisaged that the container-like, unidirectionally elastic driven piston consists of fiber composite material whose reinforcing fibers are essentially arranged so as to extend unidirectionally and transverse to the direction of elasticity, preferably transverse to the longitudinal side of the driven piston.

A container-like, elastic driven piston of this design is particularly light and ensures, through the fiber orientation according to the invention, sufficient elasticity in the longitudinal direction and sufficiently high rigidity in the circumferential direction.

A particularly advantageous embodiment results if the tensile body is arranged so as to be integrated in the working chamber at the driven end. The tensile body is connectable on the inside with the moveably guided output control element, as for example with the hollow-profiled driven piston and has a tensile force applied to it in the working direction of the driven piston. In this arrangement the tensile body, e.g. a tensile rod, can be positioned exactly centrically to the axis of symmetry of the driven piston, as a result of which the tensile force can be introduced without a lever, and hence precisely perpendicular to the rod's cross sectional area, into the rod and an optimum distribution of stress can be achieved. This integrated arrangement reduces the engineering effort involved in connecting the tensile body to the output control element and results in a space saving in the overall design of the spring according to the invention.

Embedding the tensile body in the hydraulic medium also has an advantageous effect on the mass balance of the spring. The hydrostatic pressure in the working chamber increases the resilience of the tensile body, as a result of which the tensile body can be made even slimmer and hence lighter.

In an advantageous improvement to the hydraulically operated spring it is envisaged that the output control element has a container-like, elastic driven piston that can be subjected to tensile stress which encloses the working chamber at the driven end on all sides and, in an integrated manner, forms a hollow-profiled tensile body.

The container-like, elastic driven piston that can be subjected to tensile stress is, on a material-specific basis, designed in such a way that on all sides, preferably lengthwise and in a circumferential direction, it is deformable and extendible with an adapted extension stiffness. The container-like driven piston that can be subjected to tensile stress can alternatively or additionally have a deformable, extensionally stiff wall structure, such as e.g. a rigid wave-like, pleated structure, which favours elasticity where there is adjusted extension stiffness. The container-like, elastic driven piston is designed sufficiently rigidly on all sides that the compressive forces of the hydraulic medium generated by the working chamber at the driven end can be absorbed while providing an opposing force.

When the spring is loaded, the container-like, elastic driven piston that can be subjected to tensile stress can be expanded on all sides, preferably lengthwise and in a circumferential direction, whereby, as a result of the extension stiffness, an evenly distributed tensile stress can be built up in the wall cross section of the driven piston.

Hence the driven piston that can be subjected to tensile stress is suitable for assuming, at the same time, the role of a tensile body which has pronounced elasticity and ability to withstand tensile stress. The output control element of the force-displacement conversion unit and the tensile body form a functional unit here by means of which a separate tensile body can be dispensed with. The driven piston is thus at the same time a hollow profiled tensile body. This design with a dual function also leads to considerable savings on mass. In addition, a spring with such a simple construction can be adapted particularly well to the installation space limitations in a vehicle or machine.

In a particularly suitable design, the container-like, elastic driven piston that can be subjected to tensile stress consists of fiber composite material whose reinforcing fibers, in the circumferential direction, have a fiber orientation with an angle of approximately 90° to the longitudinal axis of the driven piston and the lengthwise reinforcing fibers have a fiber orientation with an angle of approximately 0° to approx. ±60° to the longitudinal axis.

In this design from fiber composite material with the preferred fiber orientation, the requirements of elasticity on the one hand and strength on the other hand that are placed on the dual function of moveable driven piston and tensile body that can be subjected to tensile stress can be guaranteed in spite of the lightweight construction. Depending on the selected fiber orientation and the material used for the reinforcing fibers, the ratio of the longitudinal and circumferential elasticity of the driven piston or tensile body can be determined and e.g. the direction of the tensile stress load and the expansion geometry adapted to the given installation space requirements.

An additional advantageous embodiment of the hydraulically operated spring envisages that the output control element has a ring-shaped driven piston which, in an integrated manner, forms a tensile body designed as a piston pull ring. In this design, the advantages of the pull ring as a tensile body on the one hand and those of the hydraulic force-displacement conversion unit on the other are combined.

A practical embodiment of the spring envisages that the working chamber at the driving end and the working chamber at the driven end are connected to each other via a—preferably flexible—connecting line. In this way, components of the hydraulic force-displacement conversion unit can be positioned so as to be spatially separated from each other, which from the perspective of the installation space limitations prevailing in engineering, particularly in automotive engineering, permits favourable arrangement and design variants of the spring. For example, by this means, niches available in the vehicle space can be utilised to capacity in the best way possible and e.g. the modules of the drive stage or driven stage be positioned where they are more easily accessible and operable for adjustment and maintenance purposes.

In a further advantageous embodiment, the hydraulic force-displacement conversion unit has a damping element.

Hence the spring according to the invention also has, in addition to the spring effect, a damping effect. The damping element, when dynamic force is applied to the spring, generates a speed-dependent opposing force which therefore, at a high speed of the force effect, rises accordingly. As a result, the mechanical impact energy is dissipated more quickly. With the damping element integrated into the hydraulic force-displacement conversion unit, the usual damping units, as a supplementary module to the spring, can be dispensed with; this, viewed in the context of the spring-damper system as a whole, likewise leads to a saving on mass and space. Hence the spring according to the invention can also be used as a mass— and space-saving spring-damper.

If the damping element is preferably positioned directly between the working chamber at the driving end and the working chamber at the driven end of the hydraulic force-displacement conversion unit, this results in a particularly space-saving design for the spring-damper unit.

Advantageously, the damping element is designed as a valve block which has a flow connection to the working chamber at the driving end and at the driven end.

The valve block may be equipped with switch flow control valves or a separate pressure and suction flow control valve which in each case are arranged in the flow path between the working chamber at the driving end and the working chamber at the driven end. Corresponding to the direction of flow and the flow resistance of the flow control valves, the desired degree of damping can be specified. The adjustable flow control valves also make it possible to set the flow resistance differently in pressurised or suction operation, whereby different damping rates can be achieved during spring compression and extension.

In accordance with a further advantageous embodiment of the hydraulically operated spring, an external hydraulic unit with a balancing working chamber is envisaged which has a flow connection to the working chambers at the driving end and at the driven end, whereby the volume of the balancing working chamber can be changed by means of a setting piston.

With these means, an adjustable buffer space is created for the hydraulic medium in the hydraulic system with which the volume of the of the hydraulic medium in the working chamber at the driving end and at the driven end of the hydraulic force-displacement conversion unit can be changed and, as a consequence, the distance between the input and output control elements determined. Hence on the one hand, the spring length can be adapted to different installation requirements and on the other, the option is created of adjusting the height of a machine object or vehicle connected to the spring. The embodiment of the spring, according to the invention, with height regulation, is lighter and more space-saving overall than known designs of level regulation systems in engineering and automotive engineering.

With the solutions according to the invention in the foregoing embodiments it is ultimately possible to provide a spring that is adapted to the weight requirements and installation limitations in a vehicle or machine unit and tailored to the relevant shape and load.

These and other features apparent from the patent claims, the description of the exemplary embodiments and the drawings can in each case either per se or in combination be implemented as advantageous embodiments of the invention for which protection is being claimed.

BRIEF DESCRIPTION OF THE DRAWINGS

The spring according to the invention shall be explained in more detail below using several exemplary embodiments. The associated drawings show the following.

DETAILED DESCRIPTION OF EMBODIMENTS OF THE INVENTION

Figure 1:
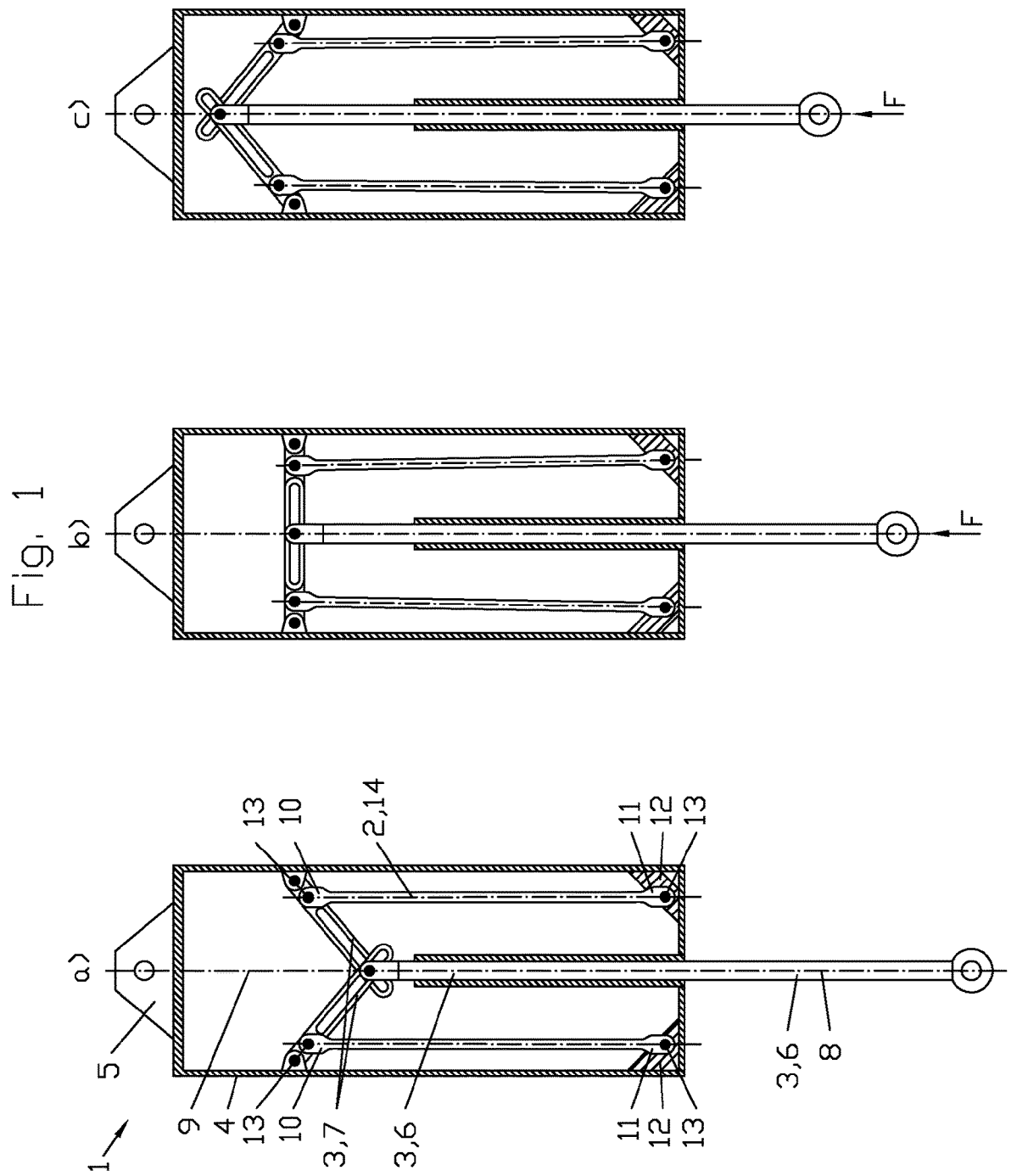
FIG. 1a,b,c Section views of a mechanical compression spring in three functional states in an exemplary embodiment with two tensile rods and a mechanical force-displacement conversion unit, FIG. 2a,b Section views of a mechanical tension spring in two functional states in an exemplary embodiment with two tensile rods and a mechanical force-displacement conversion unit, FIG. 3 Schematic cross-sectional view of a tensile rod made from fiber composite material, FIG. 4a,b,c Section views of a mechanical compression spring in three functional states in an exemplary embodiment with a pull ring and a mechanical force-displacement conversion unit, FIG. 5a,b,c Section views of a hydraulic compression spring in three functional states in an exemplary embodiment with two tensile rods and a hydraulic force-displacement conversion unit, FIG. 6a,b,c Section views of the compression spring in accordance with FIG. 5 in three functional states with a driven piston with moveable membrane, FIG. 7a,b,c Section views of a compression spring in three functional states in an exemplary embodiment with a compressive body and a hydraulic force-displacement conversion unit, FIG. 8 Section view of the compression spring in accordance with FIG. 5 with a damping element with valve block, FIG. 8.1 Detailed section view from FIG. 8, FIG. 9 Section view of the compression spring in accordance with FIG. 5 with a flexible connecting line between drive cylinder and driven cylinder and an external hydraulic unit, FIG. 10 Section view of the compression spring in accordance with FIG. 5 with a flexible connecting line and an external drive cylinder, FIG. 11a,b,c Section views of a hydraulic compression spring in three functional states in an exemplary embodiment with an external driven cylinder with a hollow cylindrical driven piston and an integrated tensile rod, FIG. 12a,b,c Section views of a hydraulic compression spring in three functional states in an exemplary embodiment with a container-like, elastic driven piston and an integrated tensile rod, FIG. 13 Section view of a hydraulic compression spring in an exemplary embodiment with a container-like, driven piston that can be subjected to tensile stress with a tensile body designed so as to be integrated, FIG. 14a,b,c Section views of a hydraulic compression spring in three functional states in an exemplary embodiment with a ring-shaped driven piston that can be subjected to tensile stress with a tensile body designed so as to be integrated, FIG. 15 Schematic representation of a mechanical compression spring in three functional states in an exemplary embodiment with a tensile rod and a mechanical force-displacement conversion unit.

FIG. 1 shows, in three functional states a, b, and c, a mechanical compression spring 1 according to the invention, comprising two tensile rods 2 as a tensile body 2 and a mechanical force-displacement conversion unit 3 operatively connected to these tensile rods 2. The tensile rods 2 and the force-displacement conversion unit 3 are arranged in a cylindrical, fixed spring housing 4, which has a fixed bearing 5 for fastening spring 1 to a vehicle construction that is not shown.

The mechanical force-displacement conversion unit 3 consists of a lever linkage 3, also called a lever system, and comprises a moveably guided drive rod 6 as an input control element 6 and two moveable lever handles 7 arranged symmetrically to one another as output control element 7. The two lever handles 7 are equally long.

The drive rod 6 is arranged centrically to the spring housing 4 and guided—so as to be axially moveable—in a guide of the spring housing 4. The two tensile rods 2 have a primarily square cross section; only at the top 10 and the foot 11 is the cross section rectangular in shape. The two tensile rods 2 are axisymmetrical and essentially parallel to the axes of symmetry 8, 9 of the drive rod 6 and the cylindrical spring housing 4, which in turn run congruent to one another. The lever handles 7 are in each case mounted at one end by means of an outer hinge on the spring housing 4 so as to be non-displaceable but capable of rotating. On the ends facing each other, the lever handles 7 are designed as an elongated hole in which the top of the drive rod 6 is mounted—so as to be displaceable—by means of a central hinge at a large distance from the outer hinges of the lever handles 7. The central hinge for accommodating the drive rod 6 is located at a distance from the outer hinges of lever handles 7 and the connection points of the tensile rods 2 on the lever handles 7 that determines the conversion ratio.

Near the outer hinges of the lever handles 7 these are each connected, in each case by means of a head joint—so as to be rotating—with a top end 10 of the tensile rods 2. At the other end, the feet 11 of the tensile rods 2 are each connected by means of a foot joint with fixing attachments 12 of the fixed spring housing 4. The fixing attachments 12 are positioned on the front wall of the fixed spring housing 4 which the drive rod 6 runs through.

The axes of rotation of the outer hinges of the lever handles 7 and those of the head joints and foot joints of tensile rods 2 and also the axis of rotation of the central hinge of the drive rod 6 are similarly perpendicularly oriented to the leaf level in FIG. 1.

For connection of the head or foot joint, the top 10 and the foot 11 of the tensile rods 2 each have bearing eyes 13 which are arranged along a longitudinal axis 14 of the particular tensile rod 2.

In a load-free, extended initial state of the compression spring 1, the drive rod 6 is in a starting position of being moved far out of the spring housing 4 (FIG. 1a), and the tensile rods 2 are tension-free.

When the drive rod 6 has an axially directed spring force F applied to it, it moves into the spring housing 4, whereby the central hinge of the drive rod 6 glides along the elongated holes of the lever handles 7 and the lever handles 7 are moved around the axis of rotation of their outer hinges. With a central position (FIG. 1b) the lever handles 7 are approximately opposite each other, whereby the tensile rods 2 experience tensile force and are extended.

The spring force F applied to the drive rod 6 is, in this exemplary embodiment, enhanced with a conversion ratio of approximately 1:5 in accordance with the lever principle, and, with a path traveled by the lever handles 7 that is approximately five times shorter, transferred as a correspondingly enhanced tensile force evenly and axially, i.e. along the tensile rods 2, onto the tensile rods 2. The tensile rods 2 fixed unilaterally to the fixed spring housing 4 are, in the process, extended evenly in the direction of their longitudinal axes 14, with each tensile rod 2 being exposed to an even tensile stress which is distributed almost homogenously across the cross section of the rod, transverse to the longitudinal axis 14 of the tensile rod 2. Hence the mass of the tensile rod 2 can for the most part be fully utilised for energy absorption.

With a maximum compression state of the spring 1 at maximum load (FIG. 1c), the drive rod 6 is in as far retracted a position as possible and the lever handles 7 in a position which is approximately a mirror image of their load-free starting position. In the process, the tensile rods 2 are subjected to maximum tensile stress with maximum possible extension.

During the extension of the compression spring 1 (not shown) the drive rod 6 moves back into the starting position according to FIG. 1a, whereby, conversely, the central hinge of the drive rod 6 slides in the elongated holes of the lever handles 7 and the load is taken off the tensile rods 2.

Figure 2:
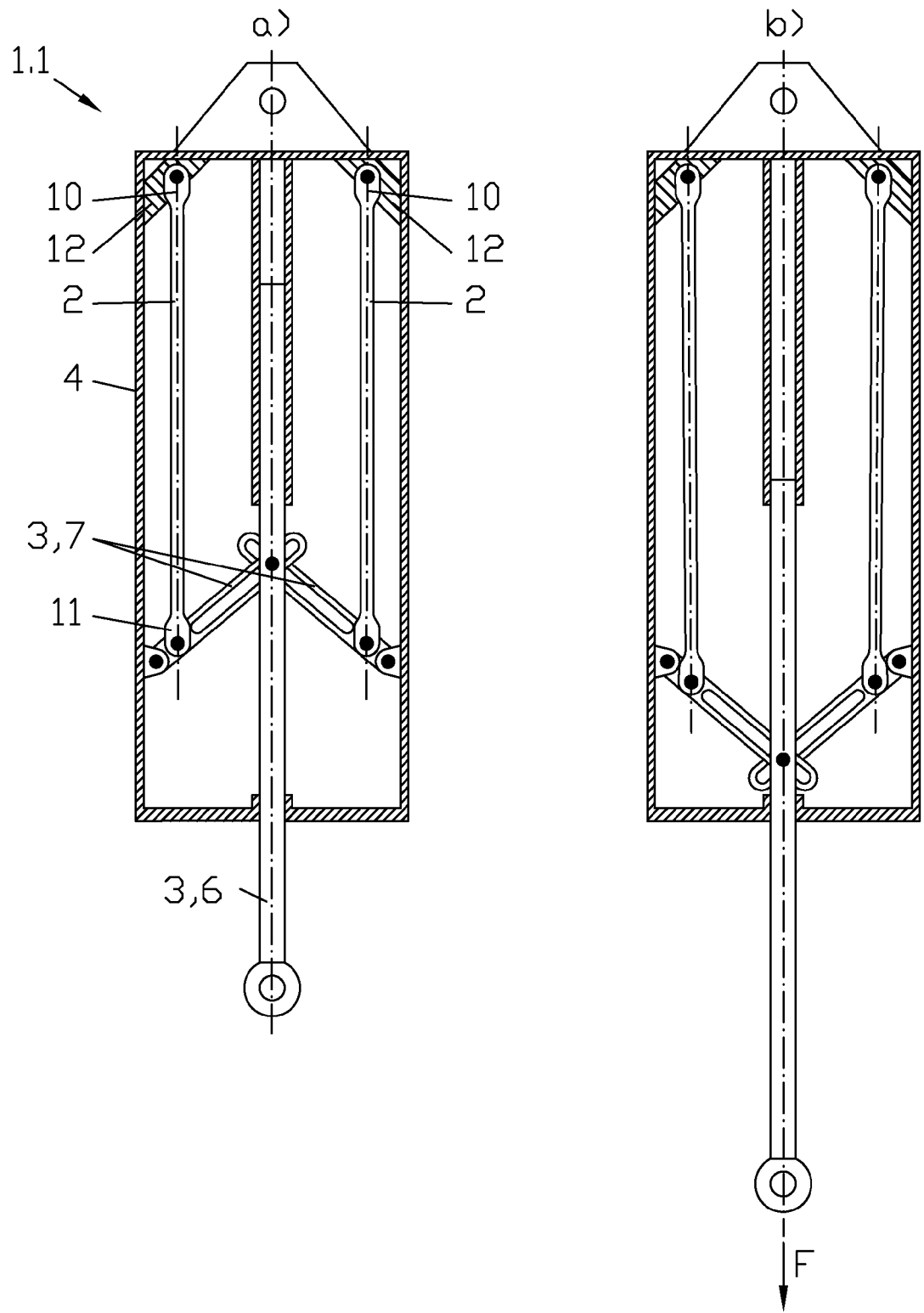

FIG. 2 shows a mechanical tension spring 1.1 according to the invention in two functional states a) and b). The tension spring 1.1 according to the invention comprises two tensile rods 2 as a tensile body 2 and a mechanical force-displacement conversion unit 3 operatively connected to these tensile rods 2. The tension spring 1.1 comprises, analogously, the components as with the mechanical compression spring 1 in accordance with FIG. 1, however in the arrangement in accordance with FIG. 2 these generate an inverse spring effect. In order to avoid repetitions, only the features and components that are different from the spring device in accordance with FIG. 1 shall be described below. The same components with the same function have the same reference numbers.

Unlike the mechanical compression spring 1 in accordance with FIG. 1, each of the lever handles 7 of the lever system 3 are, near their outer hinges, connected in each case by means of the foot joint and so as to be capable of rotating with one foot end 11 of the tensile rod 2. At the other end, the tops 10 of the tensile rods 2 are each connected by means of the head joint with the fixing attachments 12 of the fixed spring housing 4. The fixing attachments 12 are arranged on a front wall of the spring housing 4 that faces away from the passageway that accommodates the drive rod 6. The drive rod 6 is additionally guided—so as to be axially moveable—in a guide of the spring housing 4 that is arranged opposite the housing passageway.

In a load-free initial state of the tensile spring 1.1, the drive rod 6 is in a starting position of being retracted far into the guide of the spring housing 4 (FIG. 2a).

When an axially directed spring force F is applied in the direction of the arrow to the drive rod 6, the latter moves out of the spring housing 4.

With a fully compressed state of the tension spring 1.1 at maximum load (FIG. 2b), the drive rod 6 is moved as far as possible out of the spring housing 4; here, the lever handles 7 are in a position that is approximately a mirror image of their load-free starting position.

The spring force F acting on the drive rod 6 is, in the process, enhanced according to the lever principle with a conversion ratio analogous to the lever system 3 in accordance with FIG. 1 and, with a considerably shorter path, transmitted evenly and axially, i.e. along the tensile rods 2, onto the tensile rods 2. In this design, too, the tensile rods 2 are evenly extended, whereby each tensile rod 2 is, under the tensile stress that is homogenously distributed across the rod's cross section, for the most part completely utilised for energy absorption.

Figure 3:
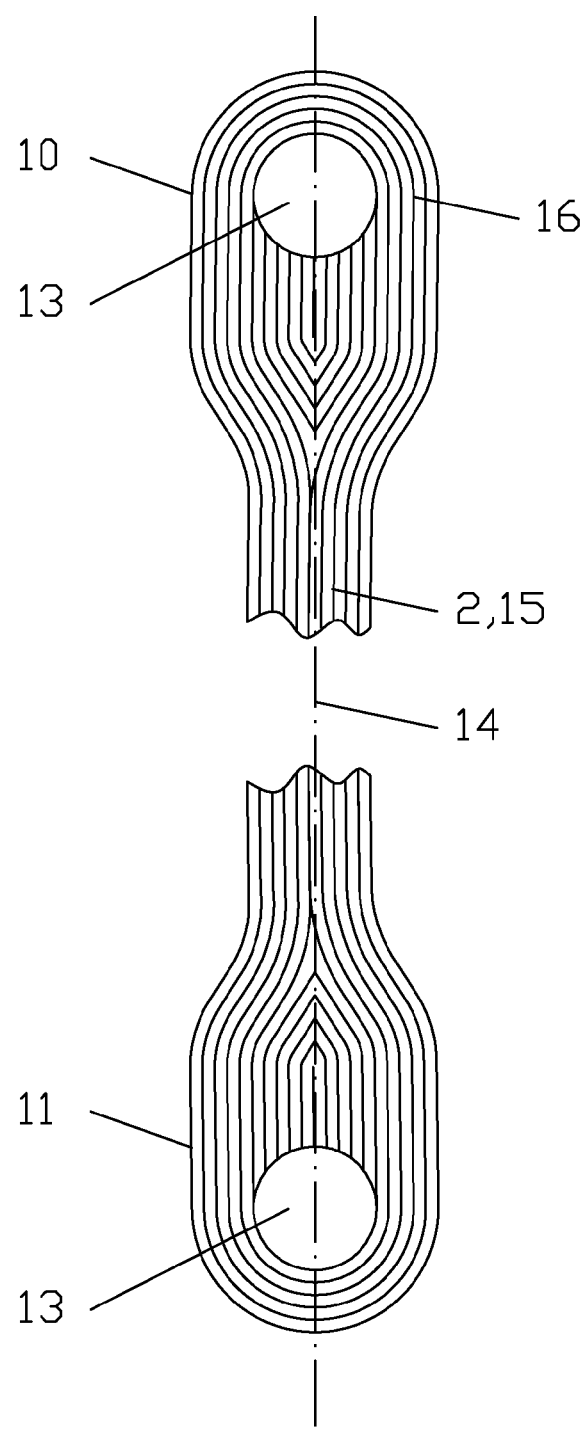

In FIG. 3, a tensile rod 2 according to the preceding exemplary embodiments is shown in sections and schematically. The tensile rod 2 consists of carbon fiber-reinforced plastic, with the fiber orientation 15 of the carbon fibers illustrated by means of individual lines. The carbon fibers are essentially arranged along the longitudinal axis 14 of the tensile rod 2 and extend continuously. In the area of the top 10 and the foot 11 of the tensile rod 2 the tensile rod 2 is thickened and in each case encloses a bearing eye 13. The majority of the carbon fibers form, at the top 10 and foot 11 of the tensile rod 2, a fiber loop 16 around the bearing eyes 13 in each case and thus strengthen the tensile rod 2 in these areas.

Figure 4:
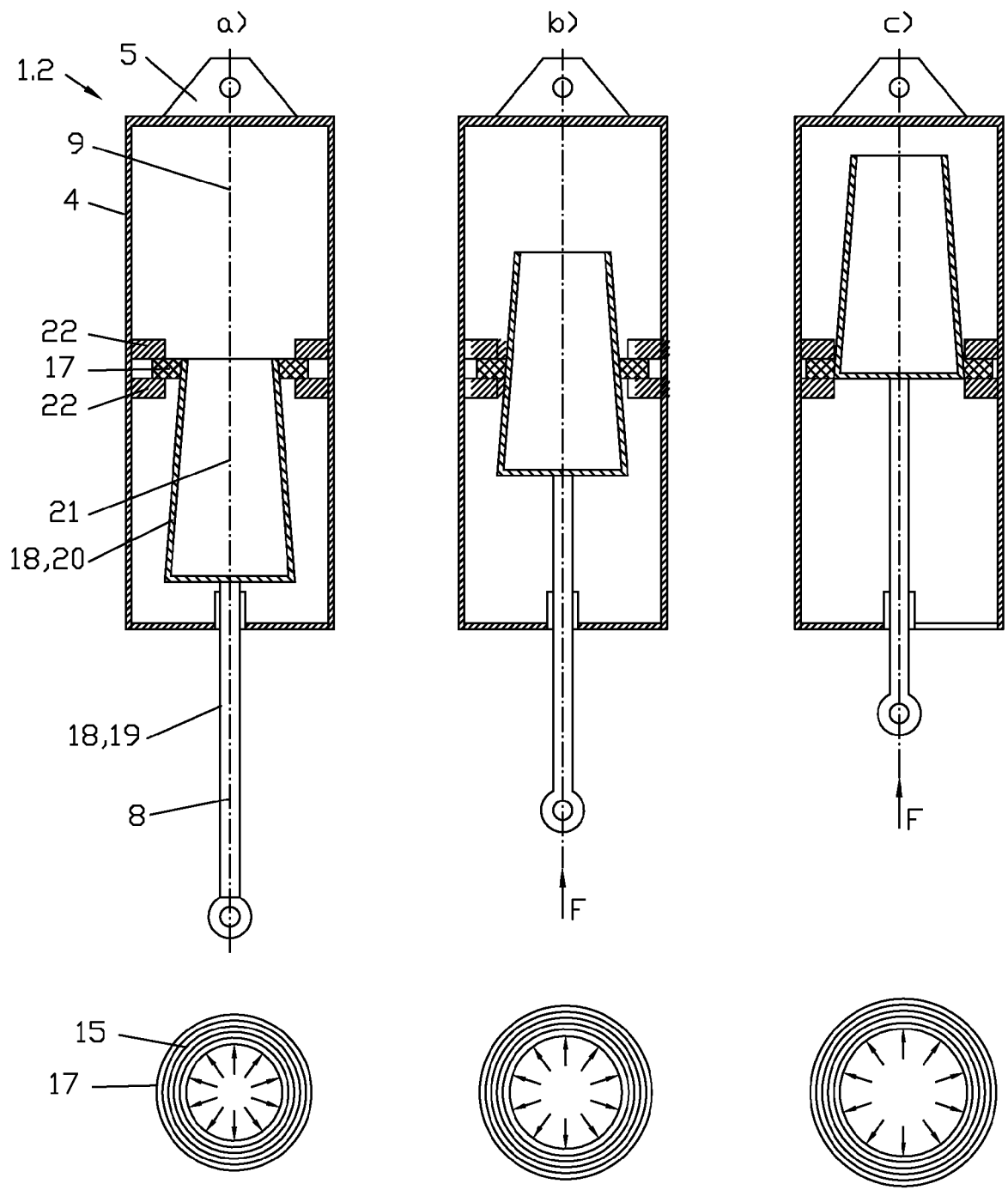

FIG. 4 shows, in three functional states a, b, c, in each case a section view of a compression spring 1.2 according to the invention which comprises a pull ring 17 as a tensile body 17 and a conical linkage 18 adapted for the pull ring 17 as a mechanical force-displacement conversion unit 18. In addition to the section views of the compression spring 1.2 in the functional states a, b, c, the pull ring 17 is shown in the associated state in a plan view in each case.

The pull ring 17 and the force-displacement conversion unit 18 are arranged in the cylindrical, fixed spring housing 4, which has the fixed bearing 5 for attaching the spring 1.2 to a vehicle construction (not shown).

The mechanical force-displacement conversion unit 18 has, as an input control element 19, a moveable push rod 19 and, as an output control element 20, a tapered plunger 20 that is directly connected to the push rod 19.

The push rod 19 and the plunger 20 designed as an extension of the push rod 19 are arranged centrically to the spring housing 4, whereby the push rod 19 is guided—so as to be axially moveable—in a guide of the spring housing 4 and the plunger 20 engages with the pull ring 17.

The pull ring 17 is arranged coaxially to the congruent axes of symmetry 8, 21, 9 of the drive rod 19, the plunger 20 and the cylindrical spring housing 4 and, by means of a ring guide 22 provided on the inner wall of the cylindrical spring housing 4 with a groove all the way round, fixed axially and mounted—so as to be radially moveable—on the spring housing 4.

The pull ring 17 consists of glass fiber-reinforced plastic and has a rectangular ring cross section. The glass fibers are arranged extending circumferentially along the circumferential axis of the pull ring 17 in the manner of annual rings. The fiber orientation 15 of the glass fibers is shown in the plan view of the pull ring 17 by means of circular lines.

At its free end, the tapered plunger 20 has a diameter that corresponds to that of the tension-free pull ring 17. At the other end, facing the push rod 19, the tapered plunger 20 has a diameter which corresponds to the widened diameter of the fully extended pull ring 17 in a preliminary stage prior to its strength failure.

In a load-free, extended initial state of the compression spring 1.2, the push rod 19 is in a starting position of being moved far out of the spring housing 4 (FIG. 4a), so that the free end of the plunger 20 is just about engaged with the tension-free pull ring 17.

When the push rod 19 is in a compressed position (FIG. 4b) it has an axially directed spring force F applied to it, whereby the push rod 19 moves into the spring housing 4. During the axially directed movement of the push rod 19, the tapered plunger 20 performs a relative movement to the corresponding conical inner surface of the pull ring 17. In the process, the surface of the plunger 20 slides on the corresponding inner surface of the pull ring 17. The surface of the plunger 20 and the inner surface of the pull ring 17 are designed so as to be appropriately low-friction e.g. through low surface roughness and/or a through a lubricating film, so that a spring function is achieved without fundamental breakaway torques.

When the plunger 20 is driven forward, the ring guide of the pull ring 17 absorbs the direct compressive force acting axially on the pull ring 17 and thereby holds the pull ring 17 in an axially secured position.

The spring force F applied to the push rod 19 is enhanced through the retracting plunger 20 in accordance with the lever principle, and with a considerably shorter path of the plunger 20, transmitted in a radial direction as enhanced compressive force evenly onto the inner surface of the pull ring 17. In the ring cross section of the pull ring 17, a tensile stress acting in a polar orthotropic manner is generated as a result, which is directed along the circumferential axis of the pull ring 17 in the manner of annual rings. Under the tensile force distributed almost homogeneously across the ring's cross section, the pull ring 17 is extended evenly along its circumferential axis, whereby for the most part complete utilisation of the ring's cross section for energy absorption is brought about.

With a maximum compressed state of the spring 1.2 at maximum load (FIG. 4c), at which the area of the tapered plunger 20 with the largest diameter corresponds to the inner surface of the pull ring 17, the pull ring 17 is subjected to the maximum tensile stress and, at the same time, the maximum possible extension of the pull ring 17 is achieved. Further stretching would lead to a failure of the pull ring 17, which is avoided through the geometry of the plunger 20 and the guide.

Figure 5:
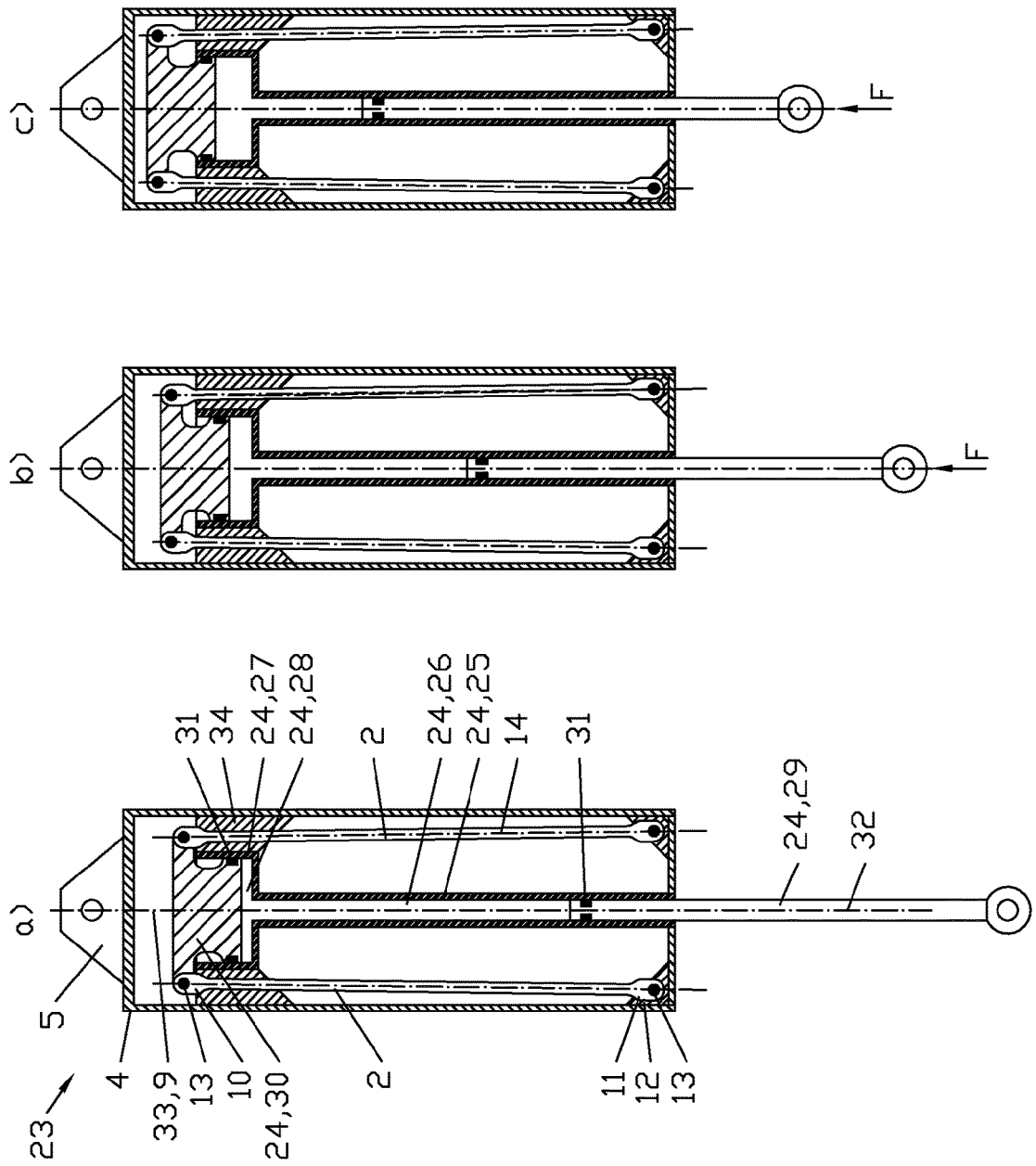

FIG. 5 shows a hydraulic compression spring 23 according to the invention in an exemplary embodiment with two tensile rods 2 and a hydraulic force-displacement conversion unit 24 in three functional states a, b, c.

This embodiment of a compression spring 23 comprises, unlike the spring devices according to FIGS. 1, 2 and 4, instead of the mechanical force-displacement conversion unit 3 or 18 a hydraulic force-displacement conversion unit 24. In order to avoid repetitions, only the features and components that differ from the spring device according to FIG. 1 shall be described below. The same components with the same function have the same reference numbers.

The hydraulic force-displacement conversion unit 24 has a two-stage hydraulic cylinder filled with hydraulic oil which, in a drive stage, comprises a drive cylinder 25 with a working chamber 26 at the driving end and, in a driven stage, comprises a driven cylinder 27 with a working chamber 28 at the driven end of the hydraulic cylinder. Both working chambers 26, 28 are connected to one another.

Drive cylinder 25 and driven cylinder 27 of the hydraulic cylinder are clearly graduated in their diameter.

The diameter of the driven cylinder 27 is, in the exemplary embodiment, 5 times larger than the diameter of the drive cylinder 25.

The hydraulic force-displacement conversion unit 24 also has, as an input control element 29, a drive piston 29, which bounds the working chamber 26 at the driving end of the drive cylinder 25 on the front vis-à-vis the environment. By way of an output control element 30 of the hydraulic force-displacement conversion unit 24, a driven piston 30 is provided which bounds the working chamber 28 at the driven end on the front side vis-à-vis the environment.

Drive piston 29 and driven piston 30 are, in the drive or driven cylinder 25, 27, in each case guided so as to be axially moveable and have piston seals 31 which seal the working chambers 26, 28 vis-à-vis the environment.

The axes of symmetry 32, 33 of the input control element 29 and the output control element 30 run congruently to one another, which means that the working direction of the force-displacement conversion unit 24 is predetermined linearly and along these congruent axes of symmetry 32, 33. The tensile rods 2 are axisymmetrical and essentially arranged parallel to the two-stage hydraulic cylinder and to the force-displacement conversion unit 24.

The force-displacement conversion unit 24 is also arranged centrically to the axis of symmetry 9 of the spring housing 4, whereby the drive cylinder 25 is firmly connected to the front wall of the spring housing 4 that is opposite to the fixed bearing 5 and the driven cylinder 27 is connected by means of fixing bars 34 to the inner wall of the spring housing 4, so that no relative movement can take place vis-à-vis the spring housing 4.

On its outer circumference, the driven piston 30 is connected, by means of the head joints, to in each case one top end 10 of the tensile rods 2. The feet 11 of the tensile rods 2 are each connected, by means of a foot joint, with fixing attachments 12 which are arranged on the front wall of the fixed spring housing 4, to which the drive cylinder 25 is also attached. The bearing eyes 13 at the top 10 and foot 11 for the connection with driven piston 30 and spring housing 4 are arranged centrally to the longitudinal axis 14 of the tensile rods 2.

In a load-free, extended initial state of the compression spring 23, the drive piston 29 is in a starting position of being moved far out of the spring housing 4 (FIG. 5a) and the tensile rods 2 are tension-free.

During the compression process, in which the drive piston 29 has an axially directed spring force F applied to it, the drive piston 29 that moves in displaces the hydraulic oil in the working chamber 26 at the driving end so that it overflows into the working chamber 28 at the driven end. The displaced hydraulic oil thus drives the driven piston 30, which is lifted as a result (FIG. 5*b*). The difference in the cross sections of the two pistons 29, 30 or cylinders 25, 27 has the effect that the driven piston 30 has an approximately 25-times shorter path than that covered by the drive piston 29, but a tensile force that is approximately 25-times higher than what the initially applied spring force F transfers to the tensile rods 2. The path traveled by the driven piston 30 and the associated tensile force stretch the tensile rods 2 evenly along their longitudinal axes 14, whereby each tensile rod 2, under the tensile stress distributed almost homogeneously across its cross section is for the most part fully used for energy absorption.

With a fully compressed state of the spring 23 at maximum load (FIG. 5*c*), the driven piston 30 is in its highest position and the tensile rods 2 are subject to maximum tension with maximum possible extension.

Figure 6:
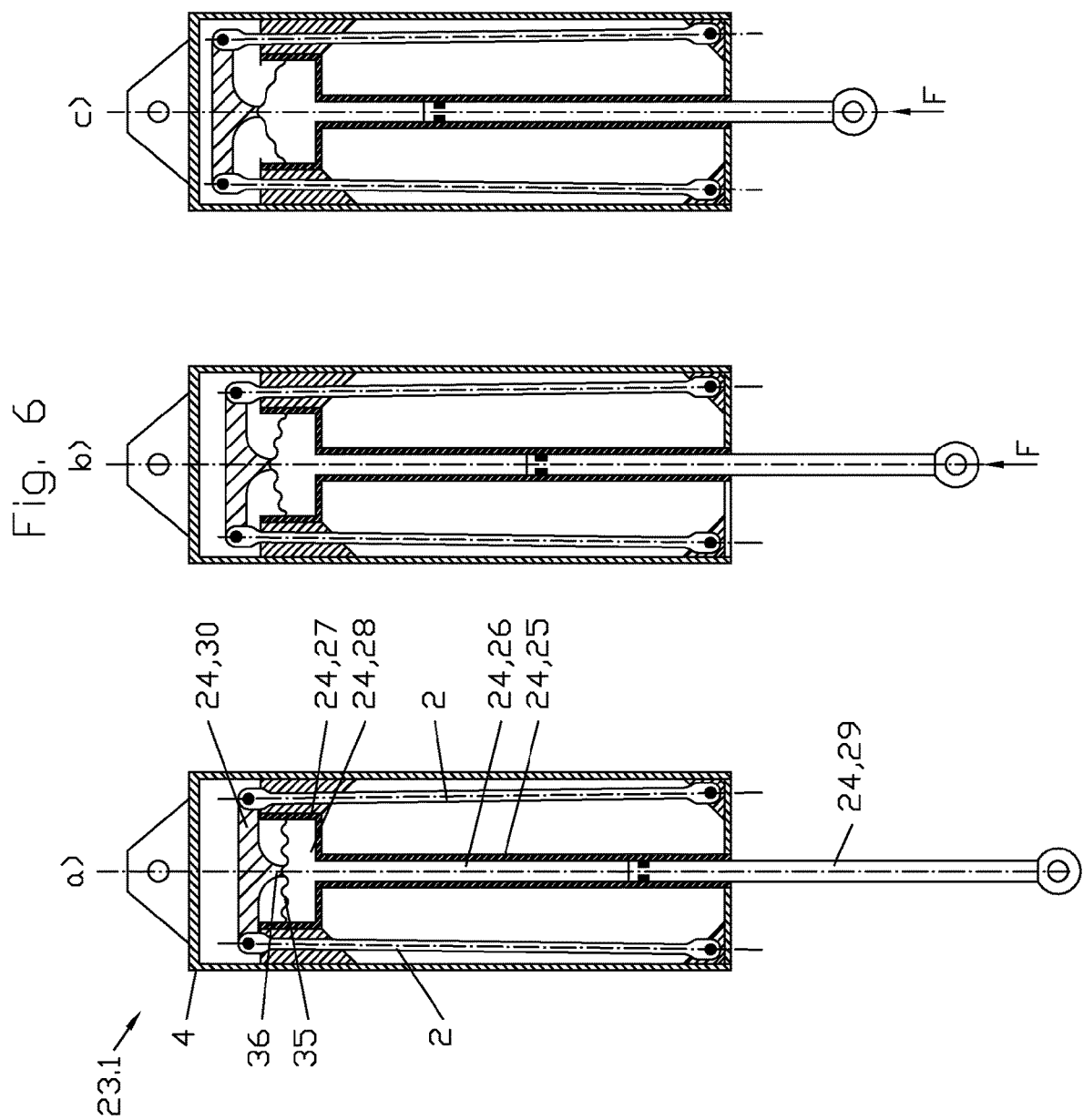

FIG. 6 shows, in three functional states a, b, c, a compression spring 23.1 which, unlike the compression spring 23 in accordance with FIG. 5, has a driven piston 30 with a moveable membrane 35. The membrane 35 is, in the exemplary embodiment, of a metallic design and has a ring-shaped, ribbed structure. It directly bounds the working chamber at the driven end 28 and on the circumferential edge is connected tightly to the inside of the driven cylinder 27, as a result of which no piston seal 31 is needed to seal off the driven cylinder 27. The driven piston 30 also comprises a foot section 36 which is in contact with the middle of the membrane 35 and transfers the movement of the membrane 35 to the piston head of the driven piston 30.

In a load-free, extended initial state of the compression spring 23.1, the drive piston 29 is in a starting position of being moved far out of the spring housing 4 (FIG. 6*a*). In this state the membrane 35 essentially closes off, evenly, the working chamber at the driven end 28. The driven piston 30 is thus at its lowest level, at which the tensile rods 2 connected to the driven piston 30 are tension-free.

With the compressed state (FIG. 6*b*) the membrane 35 buckles upwards under the spring force F and the hydraulic pressure of the displaced hydraulic oil and thus drives the driven piston 30.

With a fully compressed state of the spring 23.1 at maximum load (FIG. 6*c*), maximum buckling of the membrane 35 is achieved, whereby the driven piston 30 is in the highest position and the tensile rods 2 are subject to maximum tension with maximum possible extension.

Figure 7:
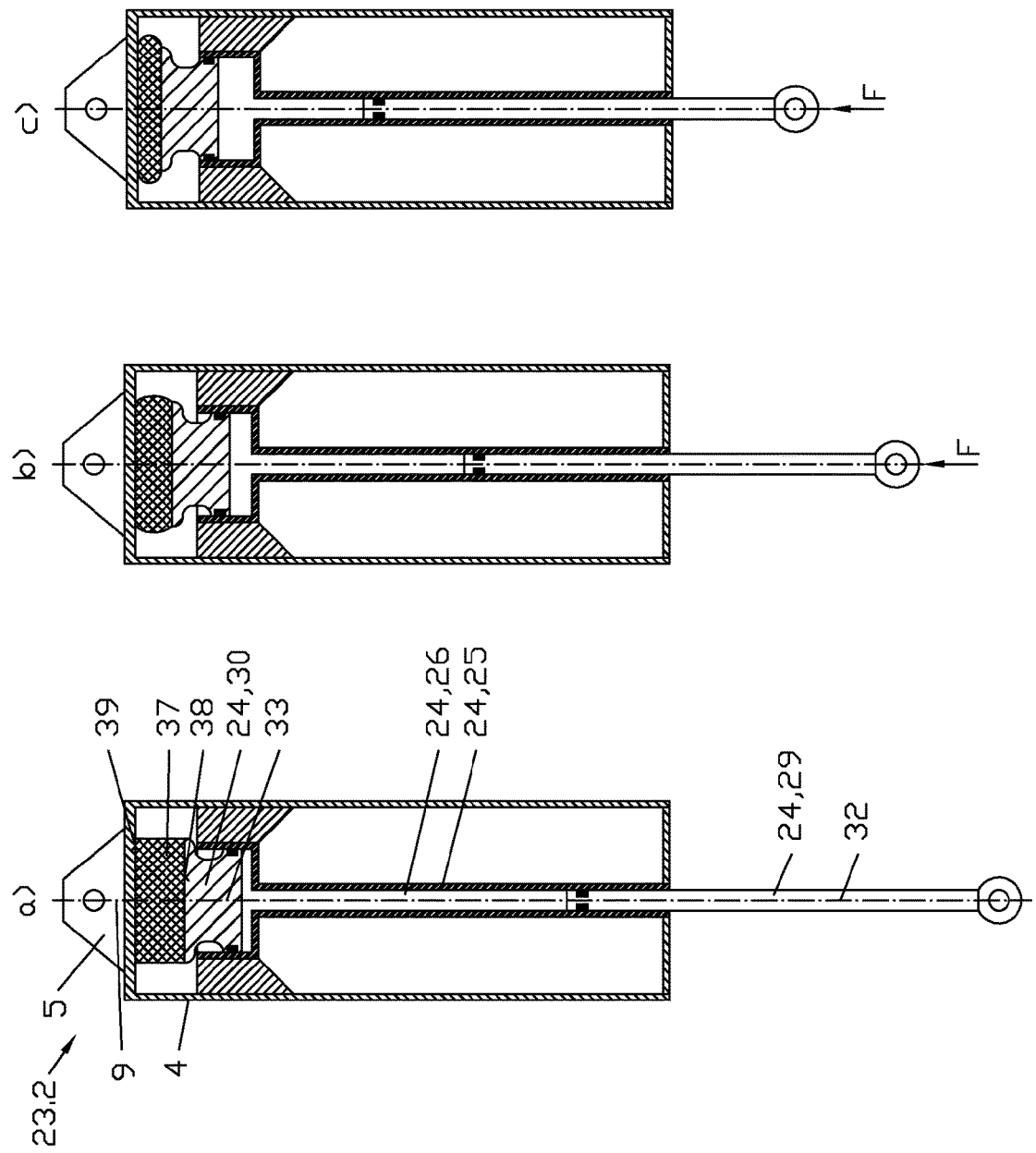

FIG. 7 shows a compression spring 23.2 according to the invention in an exemplary embodiment with a compressive body that can be subjected to compressive stress 37 and a hydraulic force-displacement conversion unit 24 in three functional states a, b, c.

Unlike the compression spring 23 in accordance with FIG. 5, with the spring device according to this exemplary embodiment, instead of tensile bodies 2 that can be subjected to tensile stress, a compressive body 37 that can be subjected to compressive stress is used. In the following, therefore, only those features and components that differ from the spring device in accordance with FIG. 5 shall be dwelt upon. The same components with the same function have the same reference numbers.

The compressive body 37 that can be subjected to compressive stress in accordance with the present exemplary embodiment is, in the load-free initial state of the compression spring 23.2, a cylindrical body made from an elastomer (FIG. 7*a*). The pressure cylinder 37 has two opposing contact surfaces 38 and 39 and is arranged in the spring housing 4 in such a way that the lower contact surface 38 contacts with an outer surface of the driven piston 30. The upper contact surface 39 is attached across its surface to an inner surface of the front wall of the spring housing 4 facing the driven piston 30, which also has the fixed bearing 5. The compressive body 37 is symmetrical to the axes of symmetry 32, 33 of the input control element 29 and the output control element 30 and hence also symmetrical to the axis of symmetry 9 of the spring housing 4. Preferably, both contact surfaces 38, 39 of the compressive body 37 are oriented perpendicular to these congruent axes of symmetry 32, 33, 9.

With the upward movement of the driven piston 30 during the compression process (FIG. 7*b*), the compressive body 37 is pressed against the spring housing 4. In the process the compressive body 37 is compressed evenly with slight bulging to the side, whereby, across its contact surfaces 38, 39 and consequently across its plane parallel cross sectional area, it experiences an almost homogeneous compressive stress. Thus the mass of the compressive body 37 can for the most part be fully utilised across the whole cross section for energy absorption.

With a fully compressed state of the compression spring 23.2 at maximum load (FIG. 7*c*), the driven piston 30 is in its highest position and the compressive body 37 is subject, under maximum buckling, to a maximum possible compressive stress across the whole cross sectional area.

During the extension of the compression spring 23.2 (not shown) the driven piston 30 moves into the starting position in accordance with FIG. 7*a*, whereby the compressive body 37 has the tension removed from it and slowly takes on its cubic form again.

The compressive body 37 made from elastomer acts, owing to the material, in a viscoelastic manner which is why, in addition to the elastic spring effect, it also provides a damping effect. In contrast, a compressive body 37 from titanium has a purely elastic effect, without a damping effect. The material of the compressive body compressive body 37 can be selected depending on the requirements of the case of application. The higher rigidity of a compressive body 37 made from titanium is compensated for by the design of a force-displacement conversion unit (not shown) which brings about a correspondingly higher force-displacement conversion ratio.

Figure 8:
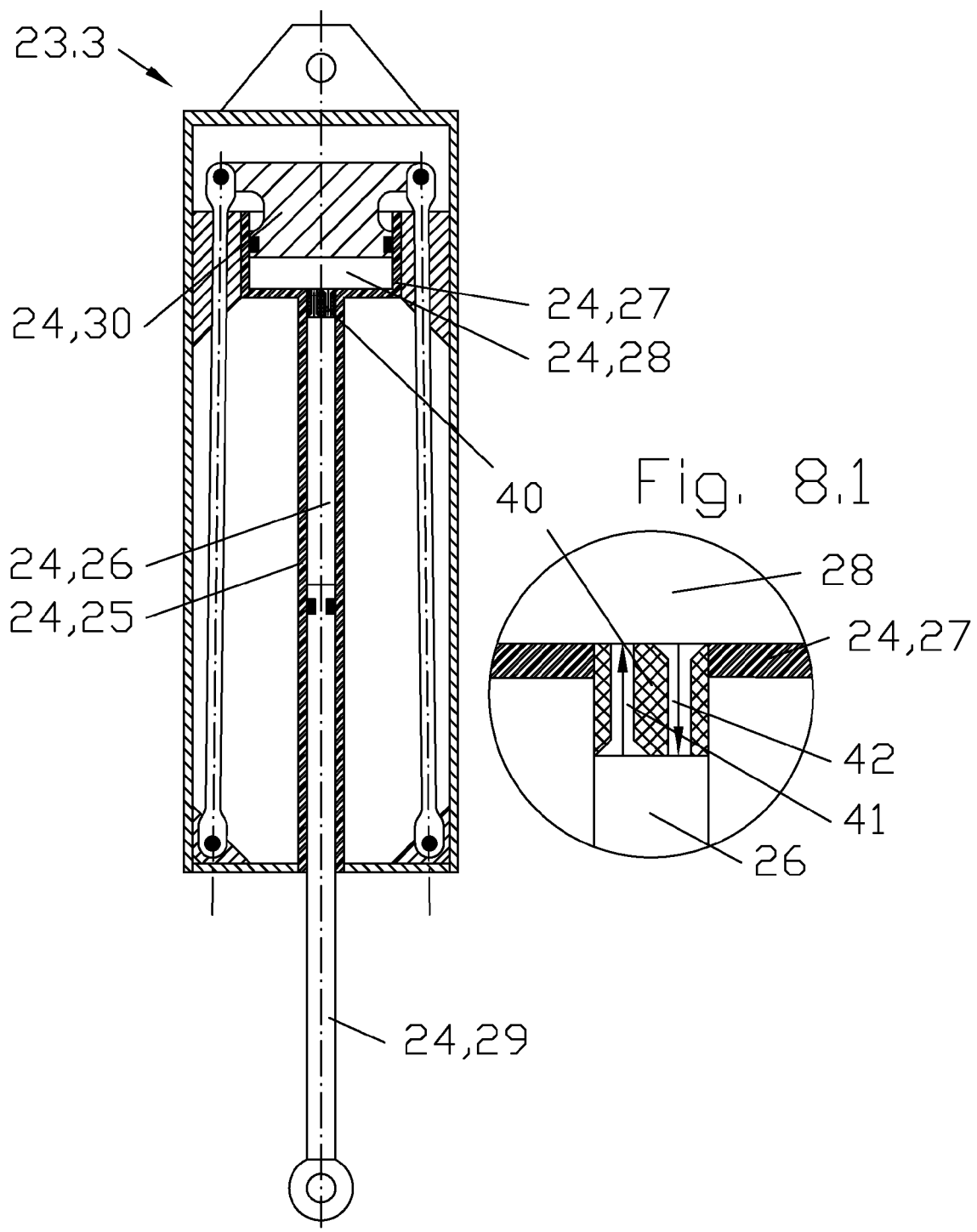

FIG. 8 shows a compression spring 23.3 according to the invention analogous to the compression spring 23 in accordance with FIG. 5, which additionally has a damping element 40. The damping element, in this exemplary embodiment, is designed as a valve block 40 which is arranged within the drive cylinder 25 on the transition to the driven cylinder 27. For clarification, the valve block 40 is shown as an enlarged, detailed drawing in FIG. 8.1. The valve block 40 has a pressure flow control valve 41 and a suction flow control valve 42, via which the hydraulic oil flows from the working chamber at the driving end 26 to the working chamber at the driven end 28 and vice versa.

Corresponding to the flow resistance of the valves 41, 42, the desired degree of damping can be specified. The smaller the design of the valve cross section or the smaller this is set to be, the more strongly the compression spring 23.3 is damped during compression or extension.

Pressure and suction flow control valves 41, 42 allow flow in one particular direction. In the opposite flow direction they have a blocking effect. In pressurised operation of the hydraulic force-displacement conversion unit 24, i.e. during compression of the compression spring 23.3 and moving-in of the drive piston 29, the hydraulic oil flows through the pressure flow control valve 41 into the working chamber at the driven end 28. In suction operation of the hydraulic force-displacement conversion unit 24, i.e. during extension of the compression spring 23.3 and moving-out of the drive piston 29, the hydraulic oil flows through the suction flow control valve 42 in to the working chamber at the driving end 26.

The one-direction flow control valves 41, 42 make it possible to set the flow resistance differently in pressurised or suction operation, by means of which different damping rates can be achieved during compression and extension.

Figure 9:
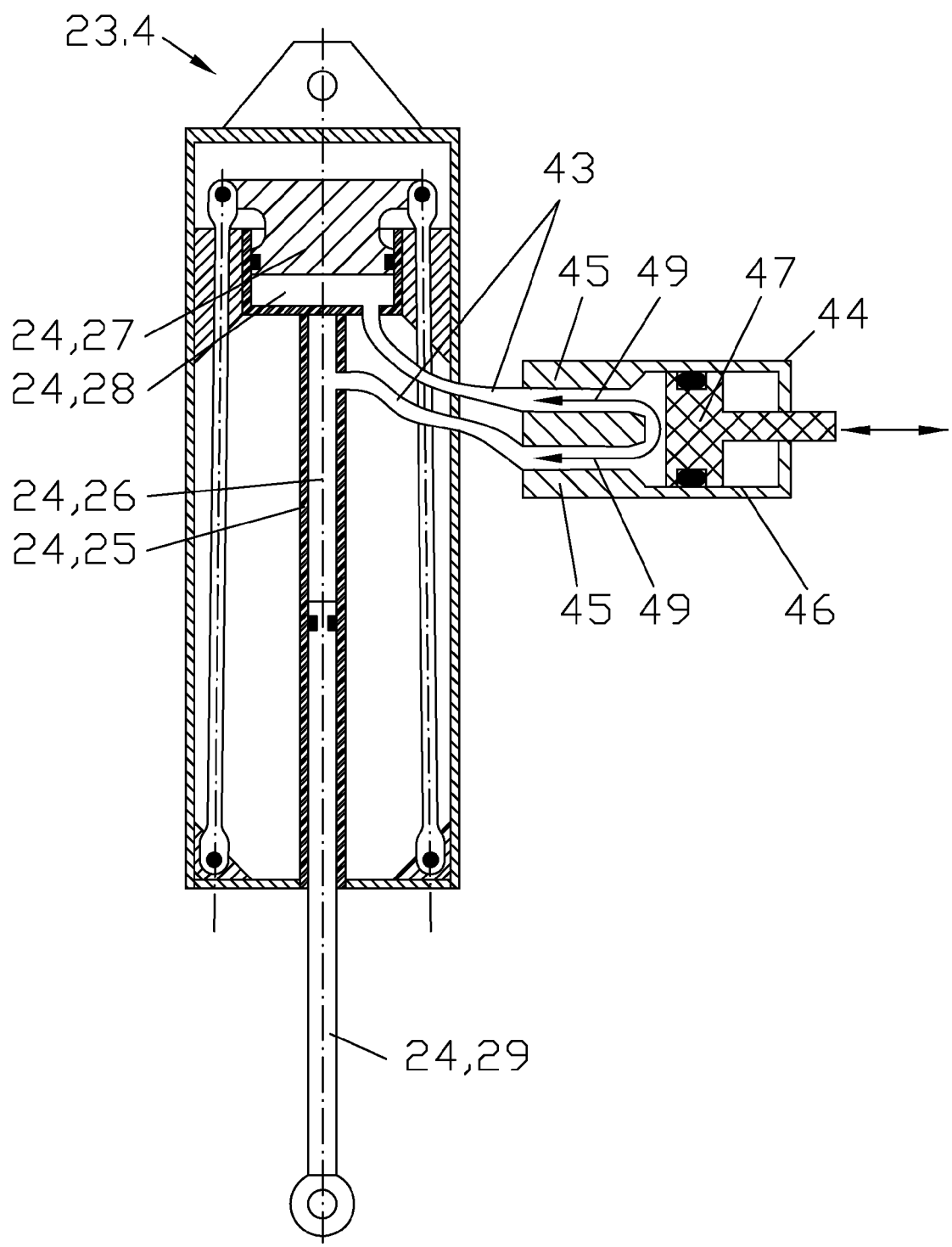

FIG. 9 shows an improved compression spring 23.4 as per the compression spring 23 in accordance with FIG. 5. In respect of the features and components that are the same, we refer you to the description for FIG. 5. Consequently only the features and components that differ shall be described below. The same components with the same function have the same reference numbers.

The drive cylinder 25 and the driven cylinder 27 of the hydraulic force-displacement conversion unit 24 have no direct connection. The working chambers at the driving and the driven end 26, 28 are connected to each other directly via a flexible connecting line 43, into which an external hydraulic unit 44 is integrated. The external hydraulic unit 44 comprises a valve block 45, similar to the valve block 40 in accordance with FIG. 8, an adjust cylinder 46 and setting piston—guided so as to be movable—47. The setting piston 47 bounds a balancing work chamber 48 which is connected via the valve block 45 and the flexible connecting line 43 to the working chambers at the driving and the driven end 26, 28. During the compression and extension process of the spring 1, the hydraulic oil is fed via the connecting line 43 through the external hydraulic unit 44, whereby the hydraulic oil passes, in succession, two adjustable switch flow valves 49 of the valve block 45. The direction of flow of the switch flow control valves 49 can be switched on an alternating basis according to the requirement in pressurised and suction operation of the hydraulic force-displacement conversion unit 24. Thus the flow of the hydraulic oil can be influenced analogously to the design in accordance with FIG. 8 and a damping effect of the compression spring 23.4 achieved. Compared with the design in accordance with FIG. 8, the valve block 45 in the external hydraulic unit 44 is particularly easily accessible and hence the damping easily adjustable/changeable.

The hydraulic oil also flows through the adjust cylinder 46, whereby the volume of the balancing work chamber 48 is determined by the position of the setting piston 47 in the adjust cylinder 46. The position of the setting piston 47 can, in the exemplary embodiment, be adjusted by means of a motor spindle (not shown). Hence irrespective of the spring function of the compression spring 23.4 according to the invention, the total volume of the working chamber at the driving end and at the driven end 26, 28 can be increased or reduced. As a result, different positions of distance can be set for the input control element 29 or the drive piston 29 relative to the output control element 30 or the driven piston 30 of the hydraulic force-displacement conversion unit 24 and hence also relative to the fixed spring housing 4. The external hydraulic unit 44 thus permits an easy adjustability, in design terms, of the compression spring 23.4 to the effect that, for example, an adaptation of the length of the compression spring 23.4 to specified installation space conditions or an effective height adjustment of the vehicle construction connected to the compression spring 23.4 can be achieved.

Figure 10:
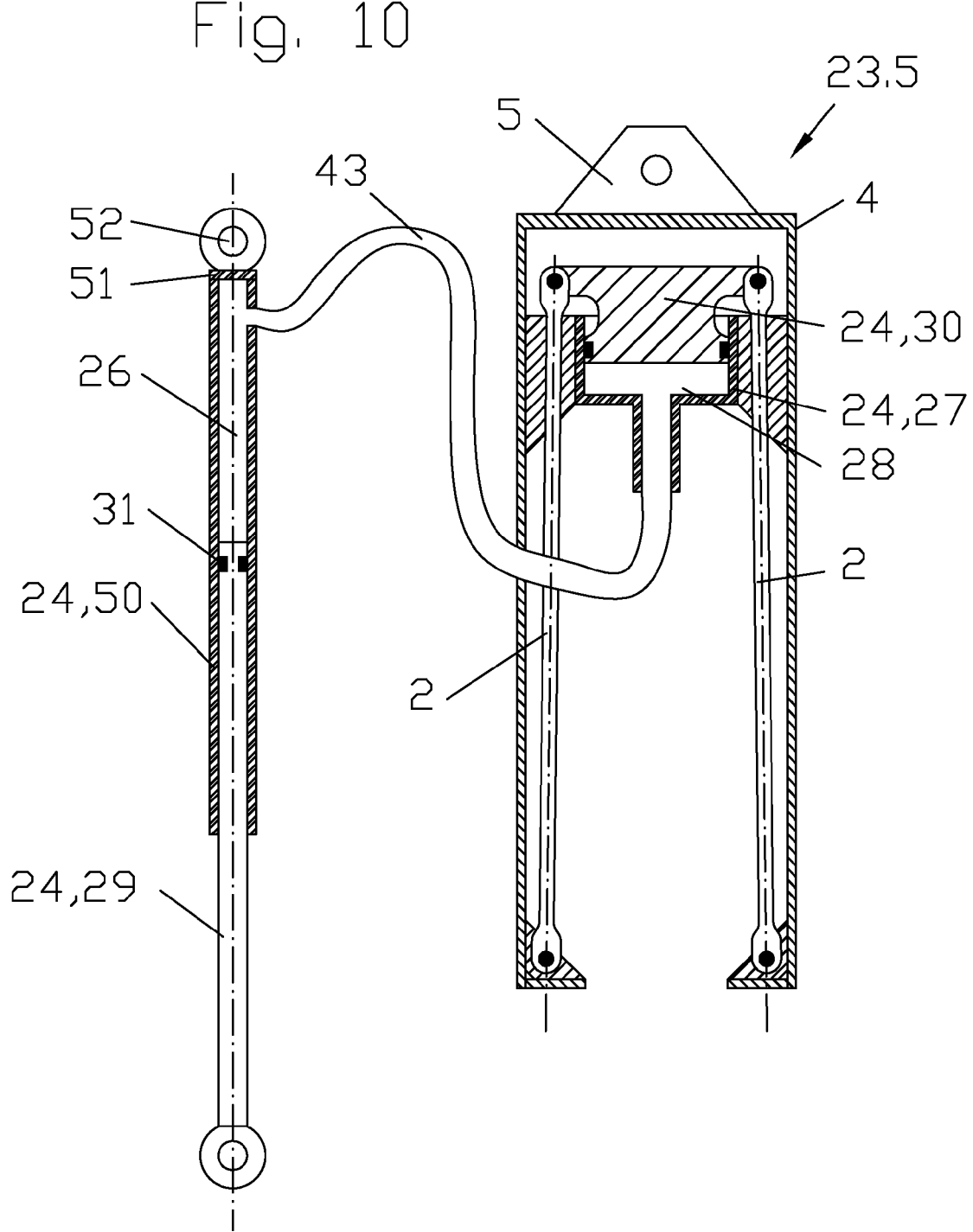

In FIG. 10 shows a compression spring 23.5 in a further modification of the compression spring 23 according to FIG. 5. In the compression spring 23.5 according to the invention in accordance with FIG. 10, unlike compression spring 23 according to FIG. 5 the drive stage of the hydraulic force-displacement conversion unit 24 is arranged outside of the spring housing 4. Referring to the description of the compression spring 23 in accordance with FIG. 5, in order to avoid repetitions only the features and components that differ shall be described below. The same components with the same function have the same reference numbers.

The drive stage of the hydraulic force-displacement conversion unit 24 has, with this exemplary embodiment, an external drive cylinder 50 that is arranged so as to be spatially separated from the spring housing 4, in which the drive piston 29 is guided. On one of the cylinder covers 51 of the external drive cylinder 50 opposite to the drive piston 29 a fixed bearing 52 is provided for attaching the external drive cylinder 50 to a vehicle construction (not shown).

The driven stage of the hydraulic force-displacement conversion unit 24 with the driven cylinder 27 and the driven piston 30 and the tensile rods 2 are arranged in the fixed spring housing 4.

The working chamber at the driving end 26 of the external drive cylinder 50 and the working chamber at the driven end 28 of the driven cylinder 27 are connected to each other, so as to enable flow, via the flexible connecting line 43.

In this way, the slim drive stage with the external drive cylinder 50 and the moveable drive piston 29 can for example be better accommodated in the confined space of a wheel suspension of the vehicle construction (not shown).

Figure 11:
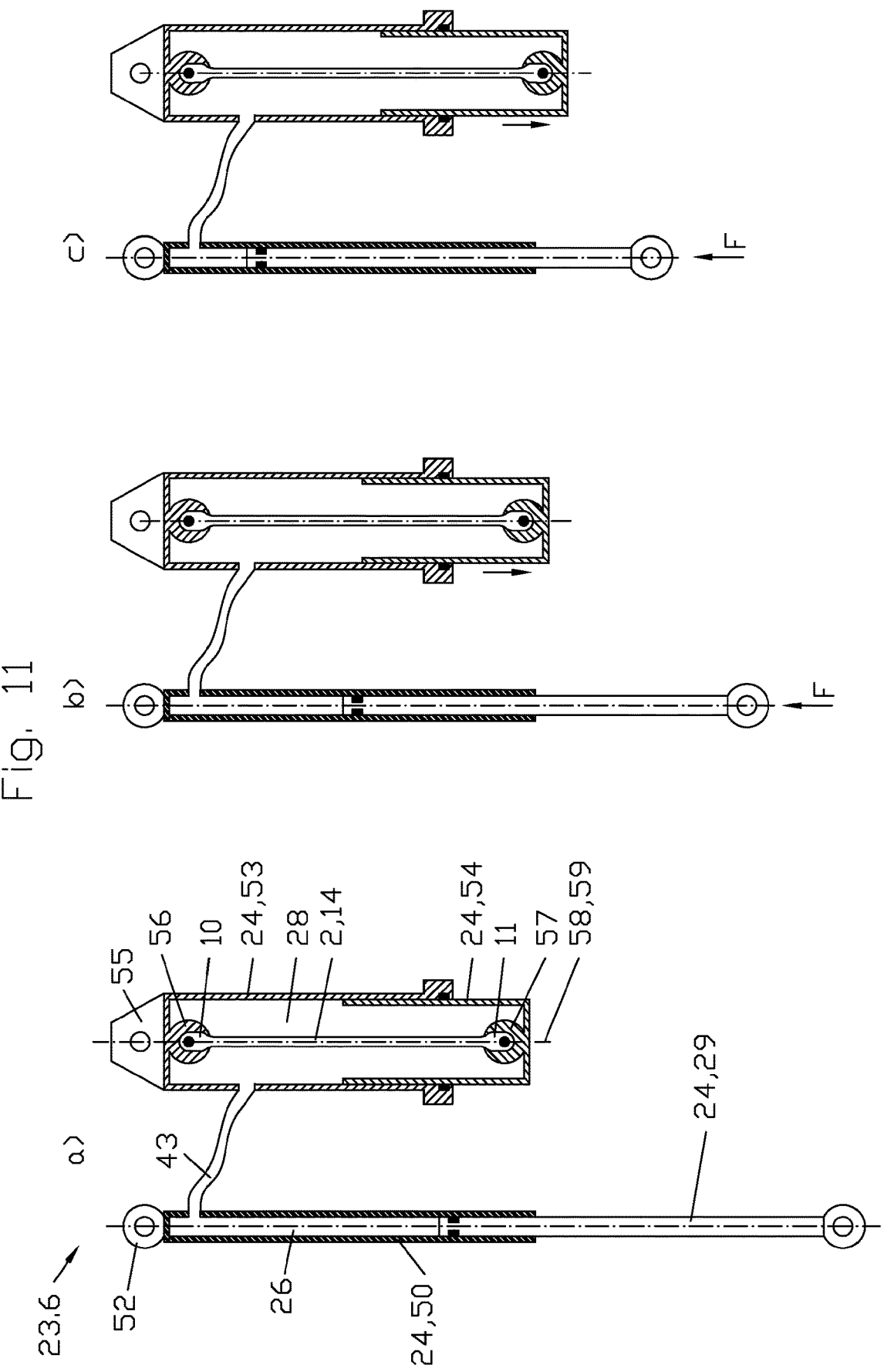

FIG. 11 shows, in three functional states a, b, c, a compression spring 23.6 in an exemplary embodiment, in which, in the driven stage of the hydraulic force-displacement conversion unit 24, an integrated tensile rod 2 is arranged.

Similar to the design of the compression spring 23.5 in accordance with FIG. 10, here too, the drive stage and driven stage of the hydraulic force-displacement conversion unit 24 are designed so as to be spatially separate from each other. The drive stage is designed analogously to the drive stage in accordance with FIG. 10 and connected to the working chamber at the driven end 28 by means of connecting line 43. Concerning these features, please refer to the description for FIG. 10 above.

The separated driven stage of the hydraulic force-displacement conversion unit 24 comprises an external driven cylinder 53 for the formation of the working chamber at the driven end 28 and a moveable, hollow-profiled, in particular hollow cylindrical, driven piston 54 as an output control element. The external driven cylinder 53 and the hollow cylindrical driven piston 54 jointly enclose the working chamber at the driven end 28. The external driven cylinder 53 is designed to be fixed by means of a fixed bearing 55, with the hollow cylindrical driven piston 54 is guided—so as to be axially moveable—in the external driven cylinder 53. The connecting line 43 leads, at the side, into the cylinder wall of the external driven cylinder 53.

A tensile rod 2 is arranged so as to be integrated and fixed in the working chamber at the driven end 28. A separate fixed spring housing for attachment of the driven cylinder 53 and the tensile rod 2 is therefore not required in this exemplary embodiment.

The top 10 of the tensile rod 2 is connected with an internal holder 56 of the external driven cylinder 53 and its foot 11 is connected with an internal holder 57 of the hollow cylindrical driven piston 54. What is more, the tensile rod 2 is arranged such that its longitudinal axis 14 runs congruently to the axes of symmetry 58, 59 of the hollow cylindrical driven cylinder 54 and the external driven cylinder 53.

The tensile rod 2 is situated so as to be space-saving and protected in the driven cylinder 53 and is fully embedded in hydraulic oil. As a result of the hydrostatic pressure acting on the tensile rod 2, the latter's resilience increases.

In a load-free, extended initial state of the compression spring 23.6, the hollow cylindrical driven piston 54 is in a starting position of being moved into the driven cylinder 53 (FIG. 11*a*), in which the tensile rod 2 is tension-free.

During the compression process, in which the drive piston 29 has an axially directed spring force F applied to it, the piston pushes the hydraulic oil out of the working chamber at the driving end 26 via the connecting line 43 to the side into the external driven cylinder 53. The displaced hydraulic oil increases the volume of the working chamber at the driven end 28 and drives the moveable driven piston 54, which is moved out as a result (FIG. 11*b*). The moving-out movement of the driven piston 54 with the associated tensile force stretches the tensile rod 2 evenly along its longitudinal axis 14, whereby the tensile stress is distributed almost homogeneously across its (rod) cross section and thus the entire mass of the tensile rod 2 is utilised for energy absorption.

In a fully compressed state of the spring 23.6 at maximum load (FIG. 11*c*), the driven piston 54 is in a position of being moved as far out as possible and the tensile rod 2 is subjected to maximum tensile stress with maximum possible extension.

Figure 12:
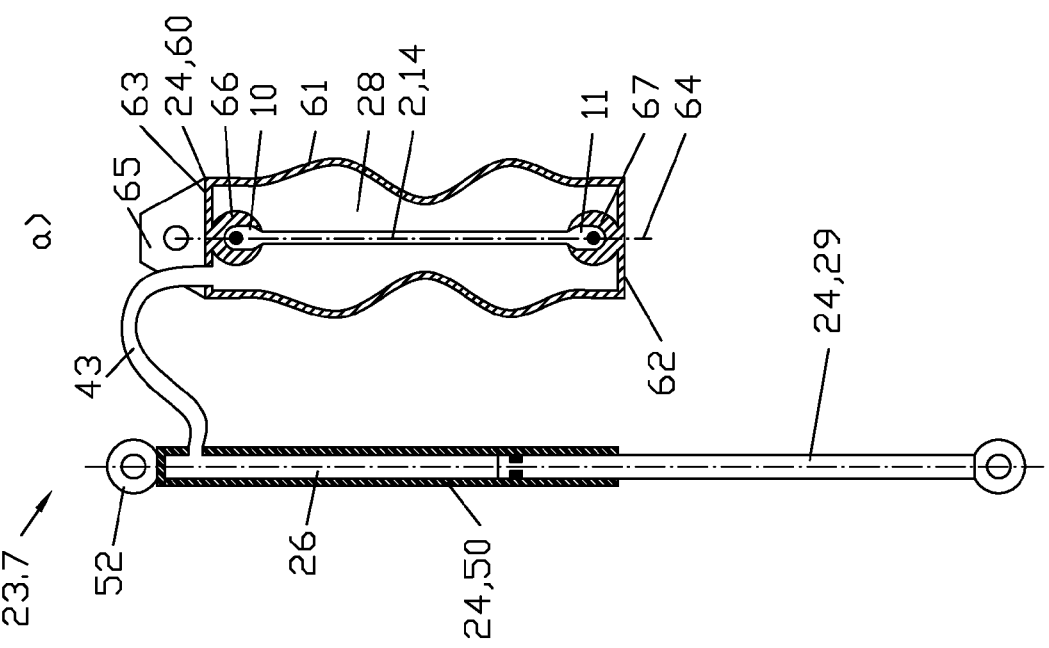

FIG. 12 shows, in three functional states, a compression spring 23.7 in an alternative exemplary embodiment to the exemplary embodiment in accordance with FIG. 11. With this compression spring 23.7 the integrated tensile rod 2 is likewise arranged in the working chamber at the driven end 28 of the spatially separated driven stage of the hydraulic force-displacement conversion unit 24. The drive stage of the force-displacement conversion unit 24 is designed analogously to the construction in accordance with FIG. 10 and connected by means of connecting line 43 to the working chamber at the driven end 28 of the force-displacement conversion unit 24.

Unlike the design in accordance with FIG. 11, the driven stage has, as an output control element, a unidirectionally elastic driven piston 60 which, in a longitudinally extending, rotationally symmetric and container-like geometry, encloses the working chamber at the driven end 28 on all sides. With this embodiment, the driven stage, unlike the design in accordance with FIG. 11, does without a driven cylinder 53 and piston seals 31. The container-like, unidirectionally elastic driven piston 60 consists of an elastic piston wall 61 and, in each case, a fixed piston head 62 and fixed piston cover 63. The connecting line 43 leads into the piston cover 63 of the elastic driven piston 60.

The piston wall 61 is, by means of an appropriate selection of material and shape, designed to be sufficiently elastic that the elastic driven piston 60 is essentially only elastic lengthways and is rigid in its radial and circumferential direction. Consequently the piston wall 61 has a rotationally symmetrical, wave-like structure formed along the length of the elastic driven piston 60, which forms uniform, convex and concave mouldings of the piston wall 61 all the way round. The unidirectionally elastic driven piston 60 also consists, in the exemplary embodiment, of a fiber composite material, with the fiber layers with reinforcing fibers arranged in endless windings around the circumference of the driven piston. The reinforcing fibers of the windings exhibit, in the circumferential direction, a fiber orientation with an angle of approximately 90° to the longitudinal axis 64 of the elastic driven piston 60.

The unidirectionally elastic driven piston 60 is, by means of a fixed bearing 65 arranged on the piston cover 63, designed to be fixed on one side, which means that the driven piston 60, lengthways, is freely moveable and expandable.

The integrated tensile rod 2 is connected with its top 10 with a holder at the cover end 66 and with its foot 11 with a holder at the head end 67 of the elastic driven piston 60. What is more, the integrated tensile rod 2 is arranged in such a way that its longitudinal axis 14 is congruent with the longitudinal axis 64 of the elastic driven piston 60.

In a load-free, extended initial state of the compression spring 23.7, the elastic driven piston 60 has a clearly distinct wave-like structure with a 'compact' longitudinal extension, with which the elastic driven piston 60 with the shortest longitudinal dimension is present. In this state, the integrated tensile rod 2 is mounted so as to be tension-free (FIG. 12*a*).

During the compression process, in which the drive piston 29 has an axially directed spring force F applied to it, the hydraulic oil is pushed out of the working chamber at the driving end 26, via the connecting line 43, into the elastic driven piston 60. The displaced hydraulic oil increases the volume of the working chamber at the driven end 28 and increases the pressure in the elastic driven piston 60, whereby the all-over pressure of the hydraulic oil extends the piston wall 61 of the elastic driven piston 60 essentially only axially, in the longitudinal direction of the driven piston 60, and consequently the elastic driven piston 60 is extended so as to be axially moveable in the direction of its piston head 62. In the process the wave-like structure of the piston wall 61 flattens out (FIG. 12*b*). However, the piston wall 61 is so rigid in a radial and circumferential direction of the elastic driven piston 60 that no radial expansion of the piston wall 61 of the driven piston 60 is generated. The container-like, unidirectionally elastic driven piston 60 is hence only extended in a longitudinal direction. The compressive forces of the hydraulic oil during the compression process are for the most part absorbed by the integrated tensile rod 2 which provides the corresponding opposing force.

Through the extension of the rotationally symmetrical driven piston 60, an axial tensile force is exerted on the centrically integrated tensile rod 2 which stretches it uniformly along its longitudinal axis 14, whereby the tensile stress is distributed almost homogeneously across its (rod) cross section and thus the entire mass of the tensile rod 2 is utilised for energy absorption.

With a fully compressed state of the spring 23.7 at maximum load (FIG. 12*c*), the elastic driven piston 60 is fully extended, whereby the wave-like structures is almost completely smoothed out. In this state, the integrated tensile rod 2 is subjected to maximum tensile stress with maximum possible extension.

During the extension of the compression spring 23.7 (not shown) the pressure of the hydraulic oil in the working chamber at the driven end 28 decreases, which means that the elastic driven piston 60 and with it the integrated tensile rod 2 returns to the starting shape in accordance with FIG. 12*a* and the tension is removed.

Figure 13:
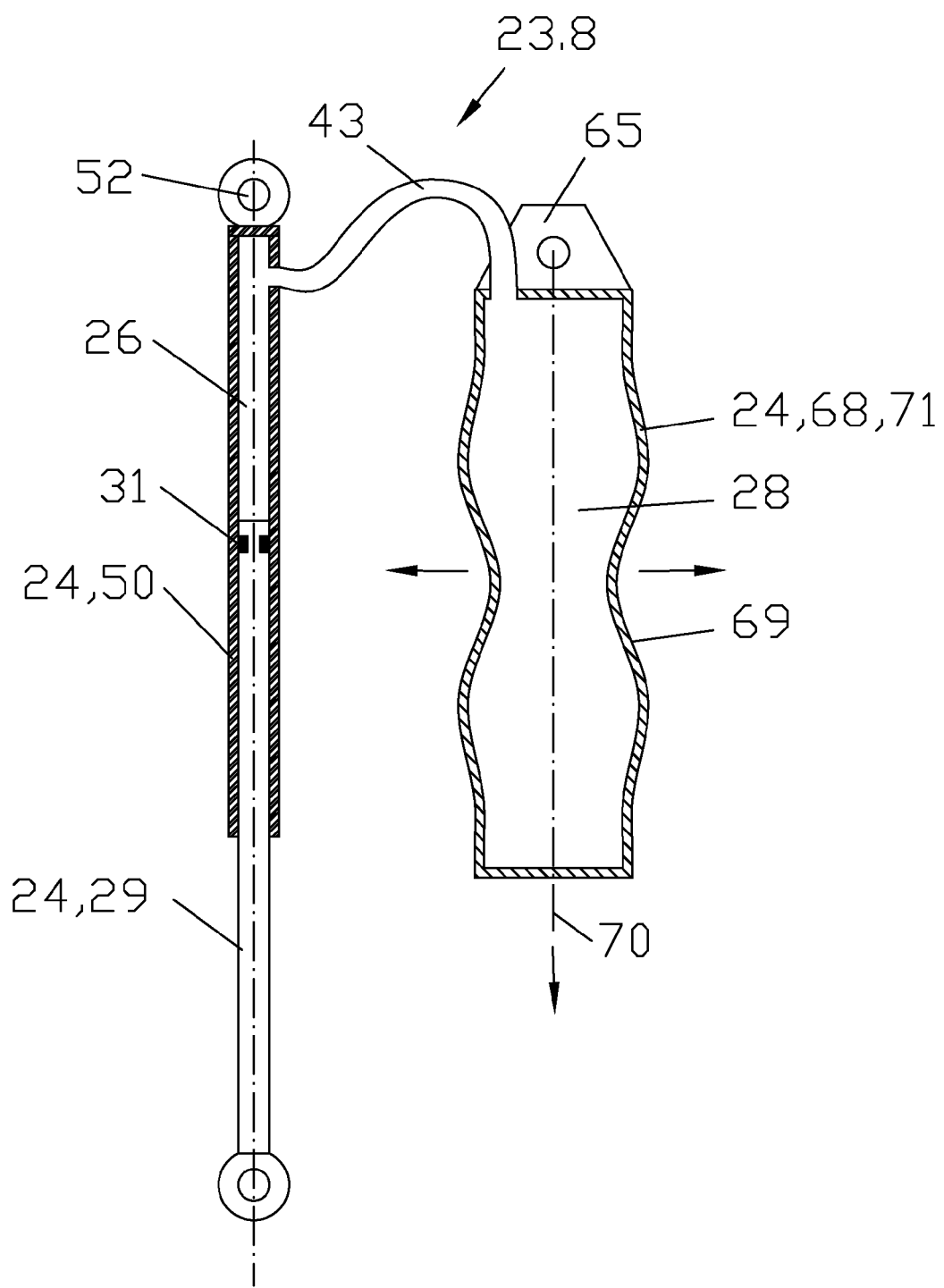

FIG. 13 shows a compression spring 23.8 in an alternative exemplary embodiment to the exemplary embodiment in accordance with FIG. 12.

Unlike the compression spring 23.7 in accordance with FIG. 12, the driven stage of the hydraulic force-displacement conversion unit 24 has, as an output control element, a driven piston 68 which is elastic and capable of withstanding tensile stress on almost all sides, which, in a longitudinally extending, container-like and rotationally symmetrical geometry, encloses the working chamber at the driven end 28 on all sides.

An elastic piston wall 69 of this driven piston 68 that can be subjected to tensile stress has, lengthwise and in its circumferential direction, an elasticity with particularly high extension stiffness.

This driven piston 68 consists, in the exemplary embodiment, of fiber composite material, specifically of endless glass fiber epoxy resin compound, with reinforcing fibers orientated both in the longitudinal direction of the driven piston and in the circumferential direction of the driven piston 68, with the reinforcing fibers in the longitudinal direction of the driven piston 68 having a fiber orientation with an angle of approximately +/−10° to the longitudinal axis 70 of the driven piston 68 and the reinforcing fibers in the circumferential direction having a fiber orientation with an angle of approximately 90° to the longitudinal axis 70 of the driven piston 68. Corresponding to the selected angle of the fiber orientation in the longitudinal axis 70 of the driven piston 68, the extension stiffness of the piston wall 69 lengthways can be influenced.

The reinforcing fibers in the longitudinal direction of the driven piston 68 consist of glass fibers, whereas the reinforcing fibers in the circumferential direction consist of highly rigid carbon fibers. By choosing the material used for the reinforcing fibers appropriately, a certain ratio of the longitudinal and circumferential extension of the driven piston 68 can be set. In the exemplary embodiment, the choice of material results in a preferred longitudinal extension of the driven piston 68, which hence adapts to narrow spaces.

Additionally, the elasticity and extension stiffness of the piston wall 69 of the driven piston 68 can be set by the wave-like structure geometry of the piston wall 69 being formed appropriately.

The compressive forces of the hydraulic oil during the compression process are, as a consequence of the extension stiffness of the piston wall 69, for the most part absorbed by the container-like driven piston 68 itself, which thus provides the corresponding opposing force.

Hence the driven piston 68 that can be subjected to tensile stress is suitable for assuming, at the same time, the role of a tensile body 71, which is equipped with a resilience to tensile stress and elasticity that is directionally combined and manifested in the longitudinal and circumferential direction. The reinforcing fibers in the longitudinal direction of the driven piston 68 allow the tensile body 71 to act like a tensile rod with resilience to tensile stress in an axial direction and the reinforcing fibers in the circumferential direction allow the tensile body 71 to act like a pull ring with resilience to tensile stress in a polar orthotropic direction. The tensile body 71 is, with this exemplary embodiment, designed as an integral part of the driven piston 68 with a body shape that is adapted to the shape of the driven piston 68, extended in the longitudinal direction and essentially hollow cylindrical. The driven piston 68, as output control element of the hydraulic force-displacement conversion unit 24, and the tensile body 71 hence form a physical and functional unit.

During the compression process of the compression spring 23.8, in which an axially directed spring force F is applied to the drive piston 29, the hydraulic oil is pushed out from the working chamber at the driven end 26 via the connecting line 43 into the elastic, driven piston 68 that can be subjected to tensile stress. The displaced hydraulic oil increases the volume of the working chamber at the driven end 28 and increases the pressure in the driven piston 68, whereby the compressive forces of the hydraulic oil acting all over generate a tensile stress in the pistol wall 69 in a longitudinal and circumferential direction of the elastic driven piston 68 that can be subjected to tensile stress, as a consequence of this the piston wall 69 of the driven piston 68 is slightly extended and in the process the driven piston 68 is extended in a longitudinal and circumferential direction. As a result of the fiber orientation and nature of the reinforcing fibers, the driven piston 68 is preferably longitudinally extended with slight radial shaping of the piston wall 69.

As a result of the rotational symmetry of the driven piston 68, the tensile stress is distributed uniformly, almost homogenously, across the wall cross section of the piston wall 69; thus the entire mass of the piston wall 69 can be utilised for energy absorption.

FIG. 14 shows a compression spring 23.9 according to the invention with a hydraulic force-displacement conversion unit 24 in three functional states a, b, c, wherein the hydraulic force-displacement conversion unit 24 has a ring-shaped, driven piston 72 that can be subjected to tensile stress as an output control element.

The spring housing 4, the drive stage of the force-displacement conversion unit 24 and the input control element 29 are identical to those in accordance with FIG. 5, which is why, in this regard, reference is made to the description for FIG. 5. In the following, therefore, only the features and components that differ shall be described. The same components with the same function have the same reference numbers.

The driven stage of the force-displacement conversion unit 24 comprises a driven drum 73, which forms the all-round working space at the driven end 28. By way of an output control element of the hydraulic force-displacement conversion unit 24, the ring-shaped driven piston 72 that can be subjected to tensile stress is provided, which bounds the working chamber at the driven end 28 on the front wall vis-à-vis the environment.

The surfaces of the ring-shaped driven piston 72 and the driven drum 73, which are facing each other, each have a sealed sliding surface 74, by means of which the ring-shaped driven piston 72 is mounted in the driven drum 73 so as to be radially moveable and the working chamber 28 is sealed vis-à-vis an outer ventilation chamber 75, that goes all the way round, of driven drum 73. The ventilation chamber 75 that goes all the way round is connected to the environment.

The drive cylinder 25 and the driven drum 73 of the hydraulic force-displacement conversion unit 24 have no direct connection. The working chambers at the driving end and at the driven end 26, 28 are connected to each other by means of a connecting line 43. The connecting line 43 leads to the curved bottom of driven drum 73.

The driven drum 73 and the ring-shaped driven piston 72 are arranged coaxially to the congruent axes of symmetry 32, 9 of the drive piston 29 and the cylindrical spring housing 4, with the driven drum 73 held firmly to the spring housing 4 by means of fixing bars 34.

The movably mounted, ring-shaped driven piston 72 has in its radial direction an elasticity with a certain extension stiffness. The compressive forces of the hydraulic oil during the compression process are, as a result of the extension stiffness, for the most part absorbed by the ring-shaped driven piston 72, which thus provides the corresponding opposing force.

Hence the ring-shaped driven piston 72 is suitable, at the same time, for assuming the role of a tensile body 76 that can be subjected to tensile stress, which is designed in the form of a pull ring, specifically a piston pull ring 76, in an integrated manner in the ring-shaped driven piston 72. The ring-shaped driven piston 72, as an output control element of the hydraulic force-displacement conversion unit 24, and the piston pull ring 76, as a tensile body, hence form a physical and functional unit.

The ring-shaped driven piston 72 with integrated piston pull ring consists of glass fiber-reinforced plastic and has a rectangular cross section to the ring. The glass fibers are arranged in the manner of annual rings along the circumferential axis of the piston pull ring 76, extending all the way around. The fiber orientation 15 of the glass fibers is shown in the cross-sectional view with points. The reinforcing fibers in the circumferential direction bring about an ability of the piston pull ring 76 to withstand tensile stress in a polar orthotropic direction.

In a load-free, extended initial state of the tension spring 23.9 the drive piston 29 is in a starting position where it is moved far out of the spring housing 4 and the ring-shaped driven piston 72 is in a position near to the bottom of the driven drum 73, in which the integrated piston pull ring 76 is tension-free (FIG. 14a).

During the compression process in accordance with FIG. 14b, the spring force F applied to the drive piston 29 is, in accordance with the lever principle of the hydraulic force-displacement conversion unit 24, increased by the hydraulic oil being displaced from the working chamber at the driving end 26 via the connecting line 43 into the working chamber at the driven end 28 and the increased pressure in the essentially smaller working chamber 28 of the driven drum 73 exerting a uniform, radially acting compressive force on an inner surface of the ring-shaped driven piston 72, which as a result is expanded in a radial direction with a considerably shorter path. In the process, air is expelled from the ventilation chamber 75. For clarification of the details and of the processes in the driven drum 73 with the ring-shaped driven piston 72, a detailed picture X shows an enlarged section from FIG. 14b.

In the ring cross section of the ring-shaped driven piston 72 or the piston pull ring 76, a tensile stress acting in a polar orthotropic manner is generated which is directed in the manner of annual rings along the circumferential axis of the piston pull ring 76. The piston pull ring 76 is extended evenly along its circumferential axis under the tensile stress distributed almost homogeneously across the ring's cross section, whereby the ring's cross section is for the most part fully utilised for energy absorption.

With a completely compressed state of the spring 23.9 at maximum load (FIG. 14c), the ring-shaped driven piston 72 or piston pull ring 76 is at its maximum expansion and subjected to maximum possible tensile stress. Extension until failure is avoided by reaching the outer limiting wall of the ventilation chamber 75.

FIG. 15 shows, in a schematic representation, a further design of a mechanical spring according to the invention, 1.3, with a tensile rod 2 and a mechanical force-displacement conversion unit 3 in three functional states.

The tensile rod 2 and the force-displacement conversion unit 3 are arranged in a fixed spring housing 4 which has a fixed bearing 5 for attaching the spring 1.3.

The mechanical force-displacement conversion unit 3 consists of a four-point lever linkage 3, which is equipped with two moveable lever handles 7.1, 7.2 and a lever handle 7.3 that connects the moveable lever handles 7.1, 7.2. The moveable lever handles 7.1 and 7.2 form the output control element 7 of the mechanical force-displacement conversion unit 3. By way of an input control element 6 of the mechanical force-displacement-conversion unit 3, a drive rod 6, guided so as to be moveable, is provided.

The drive rod 6 is arranged centrically to the spring housing 4 and guided—so as to be axially moveable—in a guide of the spring housing 4.

The lever handles 7.1, 7.2, having a length $L_1$ and $L_2$ respectively, are equally long. The length $L_1$ and $L_2$ is 100 mm in the exemplary embodiment. The one end of the lever handles 7.1, 7.2 is in each case mounted with one outer hinge on the spring housing 4 in such a way as to be rotationally moveable. The arrangement of the two lever handles 7.1, 7.2 on the spring housing 4 is such that their outer hinges are positioned at a distance from each other equating to a length $L_4$. The distance or the length $L_4$ is 75 mm in the exemplary embodiment. At their other ends, the lever handles 7.1, 7.2 are connected—so as to be rotationally moveable—by means of two central hinges with the connecting lever handle 7.3, which has a length $L_3$ that corresponds to the distance $L_4$ between the lever handles 7.1, 7.2 on the spring housing 4. Through this arrangement of the lever handles 7.1, 7.2, 7.3, a parallelogram-type four-point lever linkage is formed. On the lever handle 7.3 of the four-point lever linkage, the drive rod 6 engages.

The tensile rod 2 consisting of glass fiber-reinforced plastic is integrated so as to be rotationally moveable but in a fixed position between the lever handles 7.1, 7.2, by the top 10 and the foot 11 of the tensile rod 2 being connected with the lever handles 7.1 or 7.2 respectively so as to be rotationally moveable. The axes of rotation of the outer and central hinges of the lever handles 7.1, 7.2 and those of the head joint and foot joint of the tensile rod 2 are likewise oriented perpendicular to the leaf level in FIG. 15.

The points of connection of the top 10 and the foot 11 of the tensile rod 2 on the lever handles 7.1, 7.2 are at a varying distance from the outer and central hinges of the lever handles 7.1, 7.2 that determines the conversion ratio. The position of the point of connection of the top 10 divides the lever handle 7.1 into two handle sections of differing lengths. The left handle section of the lever handle has, in the exemplary embodiment, a length $L_{11}$ of 45 mm, while the right handle section of the lever handle 7.1 has a length $L_{12}$ of 55 mm. Likewise, the position of the point of connection of the foot 11 divides the lever handle 7.2 into two handle sections of differing lengths, whereby with an inverse length ratio, the left handle section of the lever handle 7.2 has a length $L_{21}$ of 55 mm and the right handle section of the lever handle 7.2 has a length $L_{22}$ of 45 mm.

The arrangement of the tensile rod 2 is hence not at right angles in relation to the position of the lever handles 7.1, 7.2. The tensile rod 2 has, in accordance with the present exemplary embodiment in a load-free initial state in accordance with FIG. 15a, a length $L_5$ of 72 mm.

In this load-free, extended initial state of the compression spring 1.3, the drive rod 6 is in a starting position of being moved far out of the spring housing 4 (FIG. 15a) and the four-point lever linkage 3 forms a parallelogram in which the tensile rod 2 is arranged in such a way as to be tension-free.

When an axially directed spring force F is applied to the drive rod 6, the latter moves into the spring housing 4, whereby the lever handles 7.1, 7.2 are moved around the rotational axis of their outer hinges. With a centre position (FIG. 15b), in which the four-point lever linkage 3 roughly forms a rectangle, the lever linkages 7.1, 7.2 are approximately horizontal, whereby the lever handles 7.1, 7.2, 7.3 are subjected to bending stress. Corresponding to the bending load, the lever handles 7.1, 7.2, 7.3 consist of very bending resistant material, for example of steel.

The points of connection of the top 10 and the foot 11 of the tensile rod 2 on the lever handles 7.1, 7.2 move away from each somewhat in the process, so that the tensile rod 2 that is integrated on the lever handles 7.1,7.2 in a fixed position experiences an axial tensile force and is extended in the direction of its longitudinal axis 14. The tensile rod 2 is exposed to a uniform tensile stress which is distributed almost homogeneously across the cross section transverse to the longitudinal axis 14 of the tensile rod 2. In this way, the mass of the tensile rod 2 can for the most part be fully utilised for the absorption of energy.

The spring force F applied to the drive rod 6 is, by means of the four-point lever linkage 3 in accordance with this exemplary embodiment, enhanced with a conversion ratio of approximately 1:12 according to the lever principle, and thus a tensile force that is increased approximately 12-fold transferred to the tensile rod 2.

With a maximum compressed state of the spring 1.3 at maximum load (FIG. 15*c*), the drive rod 6 is in as far a moved-in a position as possible and the lever handles 7.1, 7.2 in a final position in which the four-point lever linkage 3 forms an approximately mirror-image parallelogram vis-à-vis the load-free starting position.

The points of connection of the top 10 and the foot 11 of the tensile rod 2 on the lever handles 7.1, 7.2 are situated having the greatest possible distance from each other, whereby the tensile rod 2 is subjected to a maximum tensile stress with maximum possible extension. In the final position in accordance with FIG. 15*c*, the tensile rod is extended by 6% to a length $L_5$ of 77 mm. Here the conversion ratio of the path of the input control element 6 to the change in length of the distance of the output control element 7.1, 7.2, at the points of connection of the tensile rod 2, is approximately 12:1, i.e. only a twelfth of the spring deflection applied to the input control element 6 is transferred to the tensile rod 2.

The invention is not limited to the exemplary embodiments described above. Rather, by combining the features of the tension and compression springs 1 to 1.3, 23 to 23.9, presented, appropriate additional advantageous embodiments of the spring according to the invention are conceivable; these are covered by the invention.

LIST OF REFERENCE NUMBERS

1 Mechanical spring, compression spring, tension spring, 0.1, 0.2, 0.3
2 Tensile body, tensile rod
3 Mechanical force-displacement conversion unit, lever system, lever linkage, four-point lever linkage
4 Spring housing
5 Fixed bearing of the spring housing
6 Input control element, drive rod
7 Output control element, lever handle, 0.1, 0.2, 0.3
8 Axis of symmetry of input control element, drive rod
9 Axis of symmetry of cylindrical spring housing
10 Top of tensile rod
11 Foot of tensile rod
12 Fixing attachment
13 Bearing eye
14 Longitudinal axis of tensile rod
15 Fiber orientation of carbon fibers, of glass fibers
16 Fiber loop
17 Tensile body, pull ring
18 Mechanical force-displacement conversion unit, conical linkage
19 Input control element, push rod
20 Output control element, plunger
21 Axis of symmetry of output control element, plunger
22 Ring guide
23 Hydraulic spring, compression spring, 0.1 to 0.9
24 Hydraulic force-displacement conversion unit
25 Drive cylinder
26 Working chamber at the driving end
27 Driven cylinder
28 Working chamber at the driven end
29 Input control element, drive piston
30 Output control element, driven piston
31 Piston seal
32 Axis of symmetry of input control element, drive piston
33 Axis of symmetry of output control element, drive piston
34 Fixing bar
35 Membrane of driven piston
36 Foot section of driven piston
37 Compressive body, pressure cylinder
38 Lower contact surface
39 Upper contact surface
40 Damping element, valve block
41 Pressure flow control valve
42 Suction flow control valve
43 Connecting line
44 External hydraulic unit
45 Damping element, valve block
46 Adjust cylinder
47 Setting piston
48 Balancing working chamber
49 Switch flow control valve
50 External drive cylinder
51 Cylinder cover
52 Fixed bearing of external drive cylinder
53 External driven cylinder
54 Output control element, hollow cylindrical driven piston
55 Fixed bearing of external driven cylinder
56 Holder of external driven cylinder
57 Holder of hollow cylindrical driven piston
58 Axis of symmetry, longitudinal axis of hollow cylindrical driven piston
59 Axis of symmetry, longitudinal axis of external driven cylinder
60 Output control element, container-like, unidirectionally elastic driven piston
61 Elastic piston wall
62 Piston head
63 Piston cover
64 Axis of symmetry, longitudinal axis of elastic driven piston
65 Fixed bearing of elastic driven piston
66 Holder of elastic driven piston, cover end
67 Holder of elastic driven piston, head end
68 Output control element, container-like driven piston that can be subjected to tensile stress
69 Piston wall
70 Axis of symmetry, longitudinal axis of driven piston that can be subjected to tensile stress
71 Tensile body, hollow profiled tensile body
72 Output control element of ring-shaped driven piston that can be subjected to tensile stress 73 Driven drum
74 Sealed sliding surface
75 Ventilation chamber
76 Tensile body, piston pull ring

| F | Spring force |
|---|---|
| $L_1$ | Length of lever handle 7.1 |
| $L_2$ | Length of lever handle 7.2 |
| $L_3$ | Length of lever handle 7.3 |
| $L_4$ | Distance between lever handles 7.1, 7.2 on spring housing |
| $L_5$ | Length of tensile rod |
| $L_{11}$ | Length of left handle section of lever handle d. 7.1 |
| $L_{12}$ | Length of right handle section of lever handle d. 7.1 |
| $L_{21}$ | Length of left handle section of lever handle d. 7.2 |
| $L_{22}$ | Length of right handle section of lever handle d. 7.2 |

What is claimed is:

1. A spring, wherein the spring comprises at least one tensile rod that consists of fiber composite material and can be subjected to tensile stress, and a force-displacement conversion unit for a force-displacement conversion of a spring force F, the force-displacement conversion unit comprising a moveable input control element to which the spring force F can be applied and a moveable output control element which is operatively connected to the tensile rod in such a way that the spring force F produces essentially solely tensile stress in the tensile rod, in a specific force-displacement conversion ratio, and wherein the force-displacement conversion unit is provided with a hydraulic drive stage and a hydraulic driven stage comprising two working chambers connected to each other and filled with hydraulic medium, the input control element delimitating the working chamber at a driving end of the drive stage and the output control element delimitating the working chamber at a driven end of the driven stage, at least partially.

2. The spring of claim 1, wherein the tensile rod is arranged to be integrated in the working chamber at the driven end.

3. The spring of claim 1, wherein the working chambers at the driving end and at the driven end are connected to each other via a connecting line.

4. The spring of claim 3, wherein the connecting line is flexible.

5. The spring of claim 1, wherein the input control element has a hollow-profiled drive piston and/or the output control element has a hollow-profiled driven piston, a hollow space of the drive piston or of the driven piston delimitating a respective working chamber.

6. The spring of claim 1, wherein the tensile rod consists of carbon fiber-reinforced plastic.

7. The spring of claim 1, wherein the tensile rod consists of glass-fiber reinforced plastic.

8. The spring of claim 1, wherein on at least one end of the tensile rod a bearing eye which is arranged along a longitudinal axis/central axis of the tensile rod is formed.

9. The spring of claim 1, wherein reinforcing fibers of the fiber composite material are arranged along a longitudinal axis of the tensile rod.

10. The spring of claim 1, wherein on the tensile rod a bearing eye is formed and reinforcing fibers of the fiber composite material are arranged as a fiber loop that at least partially surrounds the bearing eye.

11. The spring of claim 1, wherein the tensile rod and the force-displacement conversion unit are configured to result in a force-displacement conversion ratio of at least 1:3.

12. The spring of claim 1, wherein the tensile rod and the force-displacement conversion unit are configured to result in a force-displacement conversion ratio of at least 1:10.

13. The spring of claim 1, wherein the tensile rod and the force-displacement conversion unit are configured to result in a force-displacement conversion ratio of at least 1:50.

14. The spring of claim 1, wherein the moveable input control element and the longitudinally extending tensile rod are arranged such that an axis of movement of the input control element is parallel to a longitudinal axis/central axis of the tensile rod.

15. The spring of claim 6, wherein reinforcing fibers of the fiber composite material are arranged along a longitudinal axis of the tensile rod.

16. The spring of claim 6, wherein on the tensile rod a bearing eye is formed and reinforcing fibers of the fiber composite material are arranged as a fiber loop that at least partially surrounds the bearing eye.

17. The spring of claim 6, wherein on at least one end of the tensile rod a bearing eye which is arranged along a longitudinal axis/central axis of the tensile rod is formed.

18. The spring of claim 7, wherein reinforcing fibers of the fiber composite material are arranged along a longitudinal axis of the tensile rod.

19. The spring of claim 7, wherein on the tensile rod a bearing eye is formed and reinforcing fibers of the fiber composite material are arranged as a fiber loop that at least partially surrounds the bearing eye.

20. The spring of claim 7, wherein on at least one end of the tensile rod a bearing eye which is arranged along a longitudinal axis/central axis of the tensile rod is formed.

* * * * *